United States Patent
Gopalakrishnan Nair et al.

(10) Patent No.: US 11,735,723 B2
(45) Date of Patent: *Aug. 22, 2023

(54) EX-SITU SOLID ELECTROLYTE INTERFACE MODIFICATION USING CHALCOGENIDES FOR LITHIUM METAL ANODE

(71) Applicant: Applied Materials, Inc., Santa Clara, CA (US)

(72) Inventors: Girish Kumar Gopalakrishnan Nair, San Jose, CA (US); Subramanya P. Herle, Mountain View, CA (US); Karl J. Armstrong, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/939,121

(22) Filed: Sep. 7, 2022

(65) Prior Publication Data

US 2023/0006197 A1 Jan. 5, 2023

Related U.S. Application Data

(63) Continuation of application No. 17/194,899, filed on Mar. 8, 2021, now Pat. No. 11,462,733, which is a
(Continued)

(51) Int. Cl.
*H01M 4/36* (2006.01)
*H01M 4/38* (2006.01)
(Continued)

(52) U.S. Cl.
CPC ......... *H01M 4/366* (2013.01); *H01M 4/0404* (2013.01); *H01M 4/0423* (2013.01);
(Continued)

(58) Field of Classification Search
CPC ........ H01M 4/134; H01M 4/366; H01M 4/38; H01M 4/382; H01M 4/58; H01M 4/581; H01M 4/661
See application file for complete search history.

(56) References Cited

U.S. PATENT DOCUMENTS 4,299,890 A 11/1981 Rea et al.
6,207,327 B1 3/2001 Takada et al.
(Continued)

FOREIGN PATENT DOCUMENTS

CN 103493258 A 1/2014
CN 106716690 A 5/2017
(Continued)

OTHER PUBLICATIONS

Xu, W.; Wang, J.; Ding, F.; Chen, X.; Nasybulin, E.; Zhang, Y.; Zhang, J.G. Energy and Environmental Science 2014, 7, 513.
(Continued)

*Primary Examiner* — Brittany L Raymond
(74) *Attorney, Agent, or Firm* — Patterson + Sheridan, LLP

(57) ABSTRACT

Implementations described herein generally relate to metal electrodes, more specifically lithium-containing anodes, high performance electrochemical devices, such as secondary batteries, including the aforementioned lithium-containing electrodes, and methods for fabricating the same. In one implementation, an anode electrode structure is provided. The anode electrode structure comprises a current collector comprising copper. The anode electrode structure further comprises a lithium metal film formed on the current collector. The anode electrode structure further comprises a solid electrolyte interface (SEI) film stack formed on the lithium metal film. The SEI film stack comprises a chalcogenide film formed on the lithium metal film. In one implementation, the SEI film stack further comprises a
(Continued)

lithium oxide film formed on the chalcogenide film. In one implementation, the SEI film stack further comprises a lithium carbonate film formed on the lithium oxide film.

20 Claims, 10 Drawing Sheets

Related U.S. Application Data continuation of application No. 16/150,111, filed on Oct. 2, 2018, now Pat. No. 10,944,103.

(60) Provisional application No. 62/583,911, filed on Nov. 9, 2017.

(51) Int. Cl.

| | | |
|---|---|---|
| *H01M 4/62* | (2006.01) | |
| *H01M 4/66* | (2006.01) | |
| *H01M 4/04* | (2006.01) | |
| *H01M 4/134* | (2010.01) | |
| *H01M 4/02* | (2006.01) | |

(52) U.S. Cl.
CPC ........... *H01M 4/134* (2013.01); *H01M 4/382* (2013.01); *H01M 4/62* (2013.01); *H01M 4/661* (2013.01); *H01M 4/667* (2013.01); *H01M 2004/027* (2013.01)

(56) References Cited

U.S. PATENT DOCUMENTS

| | | |
|---|---|---|
| 9,758,855 B2 | 9/2017 | Deppisch et al. |
| 2002/0182488 A1 | 12/2002 | Cho et al. |
| 2004/0058232 A1 | 3/2004 | Kim et al. |
| 2005/0095504 A1 | 5/2005 | Kim et al. |
| 2009/0107834 A1 | 4/2009 | Ye et al. |
| 2010/0156353 A1 | 6/2010 | Iyer et al. |
| 2010/0190051 A1 | 7/2010 | Aitken et al. |
| 2014/0001576 A1 | 1/2014 | Gandikota et al. |
| 2015/0109234 A1 | 4/2015 | Lotz et al. |
| 2016/0013462 A1 | 1/2016 | Cui et al. |
| 2016/0308243 A1 | 10/2016 | Herle et al. |
| 2017/0062832 A1 | 3/2017 | Bucur et al. |
| 2017/0214054 A1* | 7/2017 | Cui ..................... H01M 50/46 |
| 2017/0279108 A1 | 9/2017 | Herle |
| 2017/0324073 A1 | 11/2017 | Herle |
| 2017/0365854 A1 | 12/2017 | Gopalakrishnannair et al. |

FOREIGN PATENT DOCUMENTS

| | | |
|---|---|---|
| CN | 106803580 A | 6/2017 |
| CN | 107154499 | 9/2017 |
| EP | 3685460 A1 | 7/2020 |
| JP | H04248276 A | 9/1992 |
| JP | 2004247317 A | 9/2004 |
| JP | 2004319489 A | 11/2004 |
| JP | 2005129535 A | 5/2005 |
| JP | 2012-516549 A | 7/2012 |
| JP | 2012532419 A | 12/2012 |
| JP | 2014500597 A | 1/2014 |
| JP | 2017010782 A | 1/2017 |
| JP | 2017182905 A | 10/2017 |
| KR | 10-2004-0026208 A | 3/2004 |
| KR | 20050038905 A | 4/2005 |
| KR | 20120032044 A | 4/2012 |
| WO | 01-39302 A1 | 5/2001 |
| WO | 2013055573 A1 | 4/2013 |
| WO | 2016/112333 A1 | 7/2016 |
| WO | 2017131997 A1 | 8/2017 |

OTHER PUBLICATIONS

Dingchang Lin, Y.L.a.Y.C. Nature Nanotec 2017, vol. 12, 194.
Rob Matheson, https://news.mit.edu/2016/lithium-metal-batteries-double-power-consumer-electronics-0817 2016.
Wang, D.; Zhang, W.; Cui, X. Rojo, T.; Zhang, Q. Advance Science 2016, 1600168.
Lei Fan, H.L.Z., Lina Gao, Yingying Lu and Lynden A. Archer J. Mater. Chem. A 2017, 5, 3483.
Mukul D. Tikekar, S. C., Zhengyuan Tu and Lynden A. Archer Nature Energy 12016, vol. 1 11.
Cheng, X.-B.; Zhang, R.; Zhao, C.-Z.; Wei, F.; Zhang, J.-G.; Zhang, Q. Advanced Science 2016, 3, n/a.
Liu, Q. C.; Xu, J. J.; Yuan, S.; Chang, Z. W.; Xu, D.; Yin, Y. B.; Li, L.; Zhong, H. X.; Jiang, Y. S.; Yan, J. M.; Zhang, X. B. Adv Mater 2015, 27, 5241.
Zhang, K.; Lee, G.-H.; Park, M.; Li, W.; Kang, Y.-M. Advanced Energy Materials 2016, 1600811.
Zhang, X.-B. C. Q. Journal of Materials Chemistry A 2015, 3, 7207.
Kanamura, K.; Shiraishi, S.; Takehara, Z. Journal of the Electrochemical Society 1994, 141, L108.
Yan, C.; Cheng, X.-B.; Zhao, C.-Z.; Huang, J.-Q.; Yang, S.-T.; Zhang, Q. Journal of Power Sources 2016, 327, 212.
Cheng, X.-B.; Zhang, R.; Zhao, C.-Z.; Wei, F.; Zhang, J.-G.; Zhang, Q. Advanced Science 2015, n/a.
Tu, Z.; Lu, Y.; Archer, L. Small 2015.
Lu, Y.; Tu, Z.; Shu, J.; Archer, L. A. Journal of Power Sources 2015, 279, 413.
Lin, N.; Han, Y.; Wang, L.; Zhou, J.; Zhou, J.; Zhu, Y.; Qian, Y. Angewandte Chemie 2015.
Yingying Lu, Z. T., Lynden A. Archer Nature Materials 2014, 13, 961.
Khurana, R.; Schaefer, J. L.; Archer, L. A.; Coates, G. W. Journal of the American Chemical Society 2014, 136, 7395.
Liu Z. el al., Inlerfacial study on solid electrolyte inlerphase at Li metal anode: implication for Li dendrite growth, Journal of The Electrochemical Society, 2016, vol. 163, No. 3, pp. A592-A598 See abstract; and pp. A593-A597.
International Search Report and Written Opinion for International Application No. PCTIUS2018/053894.
Office Action for U.S. Appl. No. 16/150,111 dated Jun. 15, 2020.
Office Action for Japanese Application No. 2020-524784 dated Jul. 6, 2021.
Extended European Search Report for European Application No. 18876410.4 (EP 25623) dated Jul. 20, 2021.
Korean Office Action dated Oct. 8, 2021 for Application No. 10-2020-7011471.
Liu Z. el al., Inlerfacial study on solid electrolyte interphase at Li metal anode: implication for Li dendrite growth, Journal of The Electrochemical Society, 2016, vol. 163, No. 3, pp. A592-A598 See abstract; and pp. A593-A597.
International Search Report and Written Opinion for International Application No. PCTIUS2018/053894 dated Apr. 10, 2019.
Extended European Search Report for European Application No. 18876410.4 dated Jul. 20, 2021.
Office Action for U.S. Appl. No. 17/194,899 dated Feb. 15, 2022.
Chenxi et al.. Stabilized Lithium-Metal Surface in a Polysulfide-Rich Environment of Lithium-Sulfur Batteries, Journal of Physical Chemistry Letters, 5 (15), pp. 2522-2527.
Office Action for Chinese Application No. 201880071709.7 dated Aug. 29, 2022.
Search Report for Chinese Application No. 201880071709.7 dated Aug. 22, 2022.
Office Action for European Application No. 18876410.4 dated Feb. 22, 2023.
Japanese Office Action dated Apr. 18, 2023 for Application No. 2022-055933.

* cited by examiner

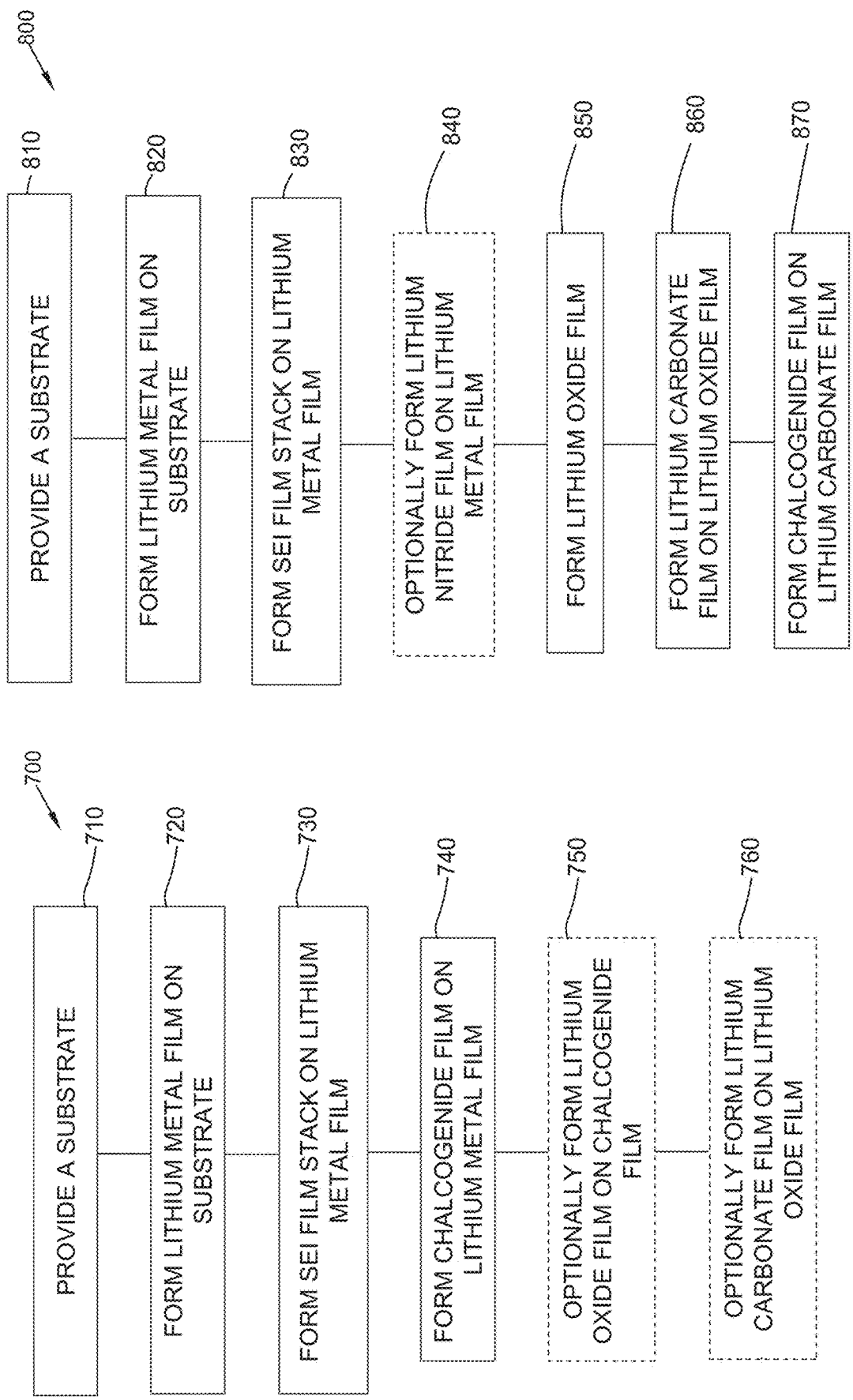

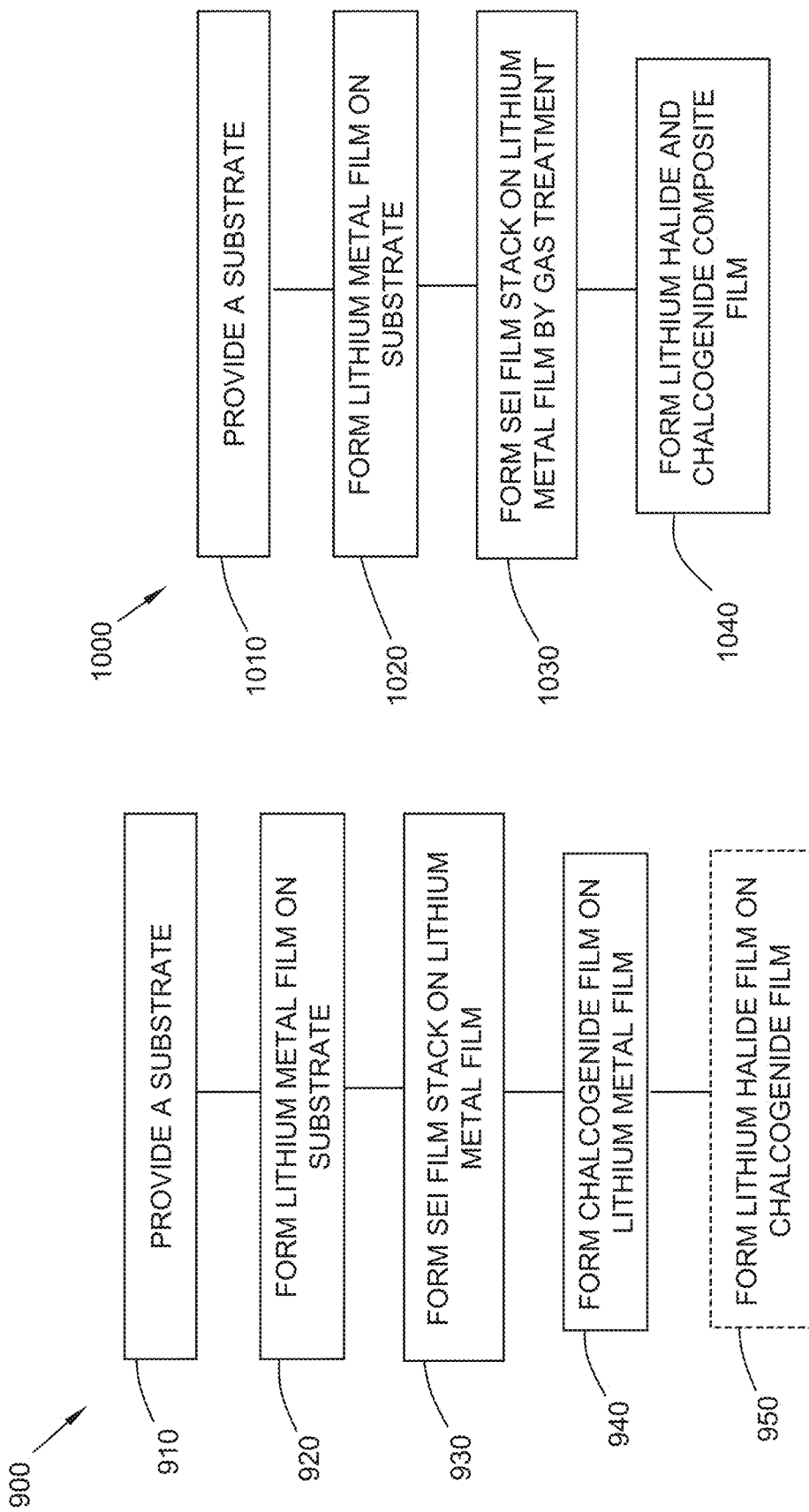

EX-SITU SOLID ELECTROLYTE INTERFACE MODIFICATION USING CHALCOGENIDES FOR LITHIUM METAL ANODE

CROSS-REFERENCE TO RELATED APPLICATIONS

This application is a continuation of U.S. patent application Ser. No. 17/194,899, filed Mar. 8, 2021, now U.S. Pat. No. 11,462,733, which is a continuation of U.S. patent application Ser. No. 16/150,111, filed Oct. 2, 2018, now U.S. Pat. No. 10,944,103, which claims benefit of U.S. Provisional Patent Application Ser. No. 62/583,911, filed Nov. 9, 2017, all of which are incorporated herein by reference in their entirety.

BACKGROUND

Field

Implementations described herein generally relate to metal electrodes, more specifically lithium-containing anodes, high performance electrochemical devices, such as secondary batteries, including the aforementioned lithium-containing electrodes, and methods for fabricating the same.

Description of the Related Art

Rechargeable electrochemical storage systems are increasing in importance for many fields of everyday life. High-capacity energy storage devices, such as lithium-ion (Li-ion) batteries and capacitors, are used in a growing number of applications, including portable electronics, medical, transportation, grid-connected large energy storage, renewable energy storage, and uninterruptible power supply (UPS). In each of these applications, the charge/discharge time and capacity of energy storage devices are key parameters. In addition, the size, weight, and/or cost of such energy storage devices are also key parameters. Further, low internal resistance is integral for high performance. The lower the resistance, the less restriction the energy storage device encounters in delivering electrical energy. For example, in the case of a battery, internal resistance affects performance by reducing the total amount of useful energy stored by the battery as well as the ability of the battery to deliver high current.

Li-ion batteries are thought to have the best chance at achieving the sought after capacity and cycling. However, Li-ion batteries as currently constituted often lack the energy capacity and number of charge/discharge cycles for these growing applications.

Accordingly, there is a need in the art for faster charging, higher capacity energy storage devices that have improved cycling, and can be more cost effectively manufactured. There is also a need for components for an energy storage device that reduce the internal resistance of the storage device.

SUMMARY

Implementations described herein generally relate to metal electrodes, more specifically lithium-containing anodes, high performance electrochemical devices, such as secondary batteries, including the aforementioned lithium-containing electrodes, and methods for fabricating the same. In one implementation, an anode electrode structure is provided. The anode electrode structure comprises a current collector comprising copper. In one implementation, the anode structure comprises a copper film. The anode electrode structure further comprises a lithium metal film formed on the current collector. The anode electrode structure further comprises a solid electrolyte interface (SEI) film stack formed on the lithium metal film. The SEI film stack comprises a chalcogenide film formed on the lithium metal film. In one implementation, the SEI film stack further comprises a lithium oxide film formed on the chalcogenide film. In one implementation, the SEI film stack further comprises a lithium carbonate film formed on the lithium oxide film. In another implementation, the SEI film stack further comprises lithium fluoride formed on the chalcogenide film.

In another implementation, an anode electrode structure is provided. The anode electrode structure comprises a current collector comprising copper. The anode electrode structure further comprises a lithium metal film formed on the current collector. The anode electrode structure further comprises a solid electrolyte interface (SEI) film stack formed on the lithium metal film. The SEI film stack comprises a lithium oxide film, a lithium carbonate film formed on the lithium oxide film, and a chalcogenide film formed on the lithium carbonate film. In one implementation, the SEI film stack further comprises a lithium nitride film formed between the lithium metal film and the lithium oxide film.

In another implementation, a method is provided. The method comprises forming a lithium metal film on a current collector, wherein the current collector comprises copper. The method further comprises forming a SEI film stack on the lithium metal film. Forming the SEI film stack comprises forming a chalcogenide film on the lithium metal film, wherein the chalcogenide film is selected from the group of bismuth chalcogenide, a copper chalcogenide, and combinations thereof. In one implementation, the SEI film stack further comprises at least one of a lithium fluoride (LiF) film, a lithium carbonate ($Li_2CO_3$) film, a lithium oxide film, a lithium nitride ($Li_3N$) film, and combinations thereof.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

FIG. 7 illustrates a process flow chart summarizing one implementation of a method for forming an anode electrode structure having a solid electrolyte interphase (SEI) film stack according to implementations described herein;

FIG. 8 illustrates a process flow chart summarizing one implementation of another method for forming an anode electrode structure having a solid electrolyte interphase (SEI) film stack according to implementations described herein;

FIG. 9 illustrates a process flow chart summarizing one implementation of another method for forming an anode electrode structure having a solid electrolyte interphase (SEI) film stack according to implementations described herein;

FIG. 10 illustrates a process flow chart summarizing one implementation of another method for forming an anode electrode structure having a solid electrolyte interphase (SEI) film stack according to implementations described herein;

Figure 1:
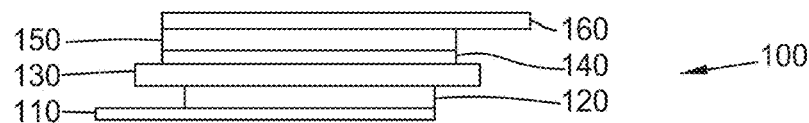
FIG. 1 illustrates a schematic cross-sectional view of one implementation of an energy storage device incorporating an electrode structure having a solid electrolyte interphase (SEI) film stack formed according to implementations described herein.

To facilitate understanding, identical reference numerals have been used, where possible, to designate identical elements that are common to the figures. It is contemplated that elements and features of one implementation may be beneficially incorporated in other implementations without further recitation.

DETAILED DESCRIPTION

The following disclosure describes lithium-containing electrodes, high performance electrochemical devices, such as secondary batteries, including the aforementioned lithium-containing electrodes, and methods for fabricating the same. Certain details are set forth in the following description and in FIGS. 1-20 to provide a thorough understanding of various implementations of the disclosure. Other details describing well-known structures and systems often associated with electrochemical cells and secondary batteries are not set forth in the following disclosure to avoid unnecessarily obscuring the description of the various implementations.

Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

Implementations described herein will be described below in reference to a roll-to-roll coating system, such as a TopMet® roll-to-roll web coating system, a SMART-WEB® roll-to-roll web coating system, a TOPBEAM® roll-to-roll web coating system, all of which are available from Applied Materials, Inc. of Santa Clara, Calif. Other tools capable of performing high rate deposition processes may also be adapted to benefit from the implementations described herein. In addition, any system enabling the deposition processes described herein can be used to advantage. The apparatus description described herein is illustrative and should not be construed or interpreted as limiting the scope of the implementations described herein. It should also be understood that although described as a roll-to-roll process, the implementations described herein may also be performed on discrete substrates.

Development of rechargeable lithium metal batteries is considered a promising technology, which can enable a high-energy-density system for energy storage. However, current lithium metal batteries suffer from dendrite growth, which hinders the practical applications of lithium metal batteries in portable electronics and electric vehicles. Over the course of several charge/discharge cycles, microscopic fibers of lithium, called dendrites form on the lithium metal surface and spread until contacting the other electrode. Passing electrical current through these dendrites can short circuit the battery. One of the most challenging aspects of enabling lithium metal battery technology is the development of a stable and efficient solid electrolyte interphase (SEI). A stable and efficient SEI provides an effective strategy for inhibiting dendrite growth and thus achieving improved cycling.

Current SEI films are typically formed in-situ during the cell formation cycling process, which is generally performed immediately after cell fabrication. During the cell formation cycling process, when an appropriate potential is established on the anode and particular organic solvents are used as the electrolyte, the organic solvent is decomposed and forms the SEI film at first charge. With typical liquid electrolytes and under lower current density, a mossy lithium deposit was reported and the lithium growth was attributed to "bottom growth." At higher current densities, a concentration gradient in the electrolyte causes 'tip growth' and this tip growth causes shorting of the cell. Depending upon the organic solvents used, the SEI film that forms on the anode is typically a mixture of lithium oxide, lithium fluoride, and semicarbonates. Initially, the SEI film is electrically insulating yet sufficiently conductive to lithium ions. The SEI prevents decomposition of the electrolyte after the second charge. The SEI can be thought of as a three-layer system with two key interfaces. In conventional electrochemical studies, it is often referred to as an electrical double layer. In its simplest form, an anode coated by an SEI will undergo three stages when charged. These three stages include electron transfer between the anode (M) and the SEI ($M^0 - ne \rightarrow M^{n+}_{M/SEI}$); cation migration from the anode-SEI interface to the SEI-electrolyte (E) interface ($M^{n+}_{M/SEI} \rightarrow M^{n+}_{SEI/E}$); and cation transfer in the SEI to electrolyte at the SEI/electrolyte interface ($E(solv) + M^{n+}SEI/E \rightarrow M^{n+}E(solv)$).

The power density and recharge speed of the battery is dependent on how quickly the anode can release and gain charge. This, in turn, is dependent on how quickly the anode can exchange lithium ions with the electrolyte through the SEI. Lithium ion exchange at the SEI is a multi-stage process and as with most multi-stage processes, the speed of the entire process is dependent upon the slowest stage. Studies have shown that anion migration is the bottleneck for most systems. In addition, it is believed that the diffusive characteristics of the solvents dictate the speed of migration between the anode-SEI interface and the SEI-electrolyte (E) interface. Thus, the best solvents have little mass in order to maximize the speed of diffusion.

Although the specific properties and reactions that take place at the SEI are not well understood, it is believed that these properties and reactions have profound effects on the cycling and capacity of the anode electrode structure. It is further believed that the SEI can thicken when cycled, slowing diffusion from the Electrode/SEI interface to the SEI/Electrolyte. For example, at elevated temperatures, alkyl carbonates in the electrolyte decompose into insoluble $Li_2CO_3$ that can increase the thickness of the SEI film, clog pores of the SEI film, and limit lithium ion access to the anode. SEI growth can also occur by gas evolution at the cathode and particle migration towards the anode. This, in turn, increases impedance and decreases capacity. Further, the randomness of metallic lithium embedded in the anode during intercalation results in dendrite formation. Over time, the dendrites pierce the separator, causing a short circuit leading to heat, fire and/or explosion.

Implementations of the present disclosure relate to constructing a stable and an efficient SEI film ex-situ. The SEI film is formed in the energy storage device during fabrication of the energy storage device. This new and efficient SEI film is believed to inhibit lithium dendrite growth and thus achieves superior lithium metal cycling performance relative to current lithium based anodes, which rely on an in-situ SEI film.

FIG. 1 illustrates a cross-sectional view of one implementation of an energy storage device 100 incorporating an anode electrode structure having an SEI film stack 140 formed according to implementations described herein. In some implementations, the energy storage device 100 is a rechargeable battery cell. In some implementations, the energy storage device 100 is combined with other cells to form a rechargeable battery. The energy storage device 100 has a cathode current collector 110, a cathode film 120, a separator film 130, the SEI film stack 140, an anode film 150 and an anode current collector 160. Note in FIG. 1 that the current collectors and separator are shown to extend beyond the stack, although it is not necessary for the current collectors to extend beyond the stack, the portions extending beyond the stack may be used as tabs. The SEI film stack 140 can have more than one layer, for example, a chalcogenide film (e.g., CuS, $Cu_2Se$, $Cu_2S$, $Cu_2Te$, CuTe, $Bi_2Te_3$, or $Bi_2Se_3$ film) in combination with at least one of lithium carbonate ($Li_2CO_3$), lithium oxide ($Li_2O$), lithium nitride ($Li_3N$), and lithium fluoride (LiF).

In one implementation, portions of the SEI film stack 140 are formed by exposing a lithium film to an $SF_6$ gas treatment to form LiF and $Li_2S$ portions of the SEI film stack 140 on the surface of the lithium film. The $SF_6$ gas can be activated to react with the exposed lithium surface either thermally or $SF_6$ gas can be plasma activated. The thickness of the SEI film stack 140 can be controlled by modifying the $SF_6$ gas exposure time and temperature.

The current collectors 110, 160, on the cathode film 120 and the anode film 150, respectively, can be identical or different electronic conductors. Examples of metals that the current collectors 110, 160 may be comprised of include aluminum (Al), copper (Cu), zinc (Zn), nickel (Ni), cobalt (Co), tin (Sn), silicon (Si), manganese (Mn), magnesium (Mg), alloys thereof, and combinations thereof. In one implementation, at least one of the current collectors 110, 160 is perforated. Furthermore, current collectors may be of any form factor (e.g., metallic foil, sheet, or plate), shape and micro/macro structure. In one implementation, at least one of the current collectors 110, 160 include a polyethylene terephthalate ("PET") film coated with a metallic material. In one implementation, the anode current collector 160 is a PET film coated with copper. In another implementation, the anode current collector 160 is a multi-metal layer on PET. The multi-metal layer can be combinations of copper, chromium, nickel, etc. In one implementation, the anode current collector 160 is a multi-layer structure that includes a copper-nickel cladding material. In one implementation, the multi-layer structure includes a first layer of nickel or chromium, a second layer of copper formed on the first layer, and a third layer including nickel, chromium, or both formed on the second layer. In one implementation, the anode current collector 160 is nickel coated copper. Furthermore, current collectors may be of any form factor (e.g., metallic foil, sheet, or plate), shape and micro/macro structure. Generally, in prismatic cells, tabs are formed of the same material as the current collector and may be formed during fabrication of the stack, or added later. All components except current collectors 110 and 160 contain lithium ion electrolytes. In one implementation, the cathode current collector 110 is aluminum. In one implementation, the cathode current collector 110 has a thickness from about 0.5 μm to about 20 μm (e.g., from about 1 μm to about 10 μm; from about 5 μm to about 10 μm). In one implementation, the anode current collector 160 is copper. In one implementation, the anode current collector 160 has a thickness from about 0.5 μm to about 20 μm (e.g., from about 1 μm to about 10 μm; from about 2 μm to about 8 μm; from about 5 μm to about 10 μm).

The anode film 150 or anode may be any material compatible with the cathode film 120 or cathode. The anode film 150 may have an energy capacity greater than or equal to 372 mAh/g, preferably 700 mAh/g, and most preferably 1000 mAh/g. The anode film 150 may be constructed from lithium metal, lithium metal foil or a lithium alloy foil (e.g. lithium aluminum alloys), or a mixture of a lithium metal and/or lithium alloy and materials such as carbon (e.g. coke, graphite), nickel, copper, tin, indium, silicon, oxides thereof, or combinations thereof. The anode film 150 typically comprises intercalation compounds containing lithium or insertion compounds containing lithium. In some implementations, wherein the anode film 150 comprises lithium metal, the lithium metal may be deposited using the methods described herein. The anode film may be formed by extrusion, physical or chemical thin-film techniques, such as sputtering, electron beam evaporation, chemical vapor deposition (CVD), three-dimensional printing, lithium powder deposition etc. In one implementation, the anode film 150 has a thickness from about 0.5 μm to about 20 μm (e.g., from about 1 μm to about 10 μm; from about 5 μm to about 10 μm). In one implementation, the anode film 150 is a lithium metal or lithium metal alloy film.

The SEI film stack 140 is formed ex-situ on the anode film 150. The SEI film stack 140 is electrically insulating yet sufficiently conductive to lithium-ions. In one implementation, the SEI film stack 140 is a nonporous film. In another implementation, the SEI film stack 140 is a porous film. In one implementation, the SEI film stack 140 has a plurality of nanopores that are sized to have an average pore size or diameter less than about 10 nanometers (e.g., from about 1 nanometer to about 10 nanometers; from about 3 nanometers to about 5 nanometers). In another implementation, the SEI film stack 140 has a plurality of nanopores that are sized to have an average pore size or diameter less than about 5 nanometers. In one implementation, the SEI film stack 140 has a plurality of nanopores having a diameter ranging from about 1 nanometer to about 20 nanometers (e.g., from about 2 nanometers to about 15 nanometers; or from about 5 nanometers to about 10 nanometers).

The SEI film stack 140 may be a coating or a discrete layer, either having a thickness in the range of 1 nanometer to 200 nanometers (e.g., in the range of 5 nanometers to 200 nanometers; in the range of 10 nanometers to 50 nanometers). Not to be bound by theory, but it is believed that SEI films greater than 200 nanometers may increase resistance within the rechargeable battery.

Examples of materials that may be included in the SEI film stack 140 include, but are not limited to a chalcogenide film (e.g., CuS, $Cu_2Se$, $Cu_2S$, $Cu_2Te$, CuTe, $Bi_2Te_3$, or $Bi_2Se_3$ film) or composite chalcogenide film optionally in combination with at least one of a lithium carbonate ($Li_2CO_3$) film, a lithium oxide ($Li_2O$) film, a lithium nitride film ($Li_3N$), and a lithium halide film (e.g. LiF, LiCl, LiBr, or LiI). In one implementation, the SEI film stack 140 is a chalcogenide film (e.g., CuS, $Cu_2Se$, $Cu_2S$, $Cu_2Te$, CuTe, $Bi_2Te_3$, or $Bi_2Se_3$ film). Not to be bound by theory but it is believed that the SEI film stack 140 can take-up Li-conducting electrolyte to form gel during device fabrication which is beneficial for forming good solid electrolyte interface (SEI) and also helps lower resistance. Suitable methods for depositing portions of the SEI film stack 140 directly on the lithium metal film include, but are not limited to, Physical Vapor Deposition (PVD), such as evaporation or sputtering, a slot-die process, a thin-film transfer process, or a three-dimensional lithium printing process. Portions of the SEI film stack may be formed by plasma treatment of previously deposited layers (e.g., oxygen plasma treatment of an exposed lithium surface to form a lithium oxide film).

The cathode film 120 or cathode may be any material compatible with the anode and may include an intercalation compound, an insertion compound, or an electrochemically active polymer. Suitable intercalation materials include, for example, lithium-containing metal oxides, $MoS_2$, $FeS_2$, $MnO_2$, $TiS_2$, $NbSe_3$, $LiCoO_2$, $LiNiO_2$, $LiMnO_2$, $Li Mn_2O_4$, $V_6O_{13}$, and $V_2O_5$. Suitable polymers include, for example, polyacetylene, polypyrrole, polyaniline, and polythiophene. The cathode film 120 or cathode may be made from a layered oxide, such as lithium cobalt oxide, an olivine, such as lithium iron phosphate, or a spinel, such as lithium manganese oxide. Exemplary lithium-containing oxides may be layered, such as lithium cobalt oxide ($LiCoO_2$), or mixed metal oxides, such as $LiNi_xCo_{1-2x}MnO_2$, LiNiMn-$CoO_2$ ("NMC"), $LiNi_{0.5}Mn_{1.5}O_4$, $Li(Ni_{0.8}Co_{0.15}Al_{0.05})O_2$, $LiMn_2O_4$, and doped lithium rich layered-layered materials, wherein x is zero or a non-zero number. Exemplary phosphates may be iron olivine ($LiFePO_4$) and it is variants (such as $LiFe_{(1-x)}Mg_xPO_4$, wherein x is between 0 and 1), $LiMoPO_4$, $LiCoPO_4$, $LiNiPO_4$, $Li_3V_2(PO_4)_3$, $LiVOPO_4$, $LiMP_2O_7$, or $LiFe_{1.5}P_2O_7$, wherein x is zero or a non-zero number. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$. Exemplary silicates may be $Li_2FeSiO_4$, $Li_2MnSiO_4$, or $Li_2VOSiO_4$. An exemplary non-lithium compound is $Na_5V_2(PO_4)_2F_3$. The cathode film 120 may be formed by physical or chemical thin-film techniques, such as sputtering, electron beam evaporation, chemical vapor deposition (CVD), etc. In one implementation, the cathode film 120 has a thickness from about 10 μm to about 100 μm (e.g., from about 30 μm to about 80 μm; or from about 40 μm to about 60 μm). In one implementation, the cathode film 120 is a $LiCoO_2$ film. In another implementation, the cathode film 120 is an NMC film.

The separator film 130 comprises a porous (e.g., microporous) polymeric substrate capable of conducting ions (e.g., a separator film) with pores. In some implementations, the porous polymeric substrate itself does not need to be ion conducting, however, once filled with electrolyte (liquid, gel, solid, combination etc.), the combination of porous substrate and electrolyte is ion conducting. In one implementation, the porous polymeric substrate is a multi-layer polymeric substrate. In one implementation, the pores are micropores. In some implementations, the porous polymeric substrate consists of any commercially available polymeric microporous membranes (e.g., single-ply or multi-ply), for example, those products produced by Polypore (Celgard Inc., of Charlotte, N.C.), Toray Tonen (Battery separator film (BSF)), SK Energy (Li-ion battery separator (LiBS), Evonik industries (SEPARION® ceramic separator membrane), Asahi Kasei (Hipore™ polyolefin flat film membrane), DuPont (Energain®), etc. In some implementations, the porous polymeric substrate has a porosity in the range of 20 to 80% (e.g., in the range of 28 to 60%). In some implementations, the porous polymeric substrate has an average pore size in the range of 0.02 to 5 microns (e.g., 0.08 to 2 microns). In some implementations, the porous polymeric substrate has a Gurley Number in the range of 15 to 150 seconds (Gurley Number refers to the time it takes for 10 cc of air at 12.2 inches of water to pass through one square inch of membrane). In some implementations, the porous polymeric substrate is polyolefinic. Exemplary polyolefins include polypropylene, polyethylene, or combinations thereof.

In some implementations of the energy storage device of the present disclosure, lithium is contained in the lithium metal film of the anode electrode, and lithium manganese oxide ($LiMnO_4$) or lithium cobalt oxide ($LiCoO_2$) at the cathode electrode, for example, although in some implementations, the anode electrode may also include lithium absorbing materials such as silicon, tin, etc. The energy storage device, even though shown as a planar structure, may also be formed into a cylinder by rolling the stack of layers; furthermore, implementations of the present disclosure also contemplate other cell configurations (e.g., prismatic cells, button cells).

Electrolytes infused in cell components 120, 130, 140 and 150 can be comprised of a liquid/gel or a solid polymer and may be different in each. In some implementations, the electrolyte primarily includes a salt and a medium (e.g., in a liquid electrolyte, the medium may be referred to as a solvent; in a gel electrolyte, the medium may be a polymer matrix). The salt may be a lithium salt. The lithium salt may include, for example, $LiPF_6$, $LiAsF_6$, $LiCF_3SO_3$, $LiN(CF_3SO_3)_3$, $LiBF_6$, and $LiClO_4$, lithium bistrifluoromethanesulfonimidate (e.g., LiTFSI), BETTE electrolyte (commercially available from 3M Corp. of Minneapolis, Minn.) and combinations thereof. Solvents may include, for example, ethylene carbonate (EC), propylene carbonate (PC), EC/PC, 2-MeTHF(2-methyltetrahydrofuran)/EC/PC, EC/DMC (dimethyl carbonate), EC/DME (dimethyl ethane), EC/DEC (diethyl carbonate), EC/EMC (ethyl methyl carbonate), EC/EMC/DMC/DEC, EC/EMC/DMC/DEC/PE, PC/DME, and DME/PC. Polymer matrices may include, for example, PVDF (polyvinylidene fluoride), PVDF:THF (PVDF:tetrahydrofuran), PVDF:CTFE (PVDF: chlorotrifluoroethylene) PAN (polyacrylonitrile), and PEO (polyethylene oxide).

Figure 2:
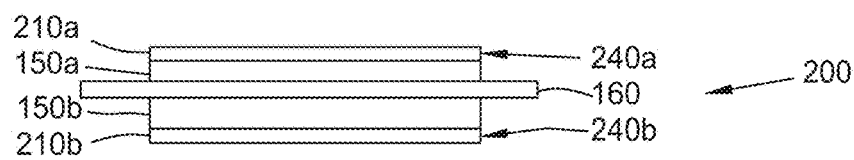
FIG. 2 illustrates a cross-sectional view of one implementation of a dual-sided anode electrode structure having a solid electrolyte interphase (SEI) film stack formed according to implementations described herein.

FIG. 2 illustrates a cross-sectional view of one implementation of a dual-sided anode electrode structure 200 having a solid electrolyte interphase (SEI) film stack 240a, 240b (collectively 240) formed according to implementations described herein. The SEI film stack 240a, 240b may be used in place of the SEI film stack 140 depicted in FIG. 1. Each SEI film stack 240a, 240b includes a chalcogenide film 210a, 210b (collectively 210) respectively formed on each anode film 150a, 150b. The chalcogenide film is selected from the group of copper chalcogenide (e.g., CuS, $Cu_2Se$, $Cu_2S$, $Cu_2Te$, CuTe), bismuth chalcogenide (e.g., $Bi_2Te_3$, $Bi_2Se_3$), and combinations thereof.

Figure 3:
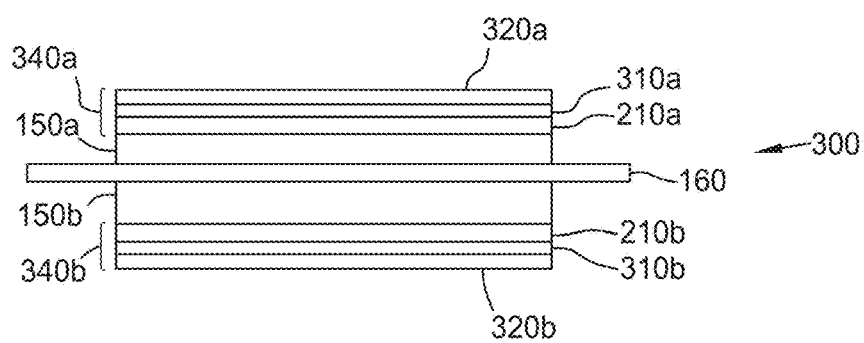
FIG. 3 illustrates a cross-sectional view of another implementation of a dual-sided anode electrode structure having a solid electrolyte interphase (SEI) film stack formed according to implementations described herein.

FIG. 3 illustrates a cross-sectional view of another implementation of a dual-sided anode electrode structure 300 having a solid electrolyte interphase (SEI) film stack 340a, 340b (collectively 340) formed according to implementations described herein. The SEI film stack 340a, 340b may be used in place of the SEI film stack 140 depicted in FIG. 1. Each SEI film stack 340a, 340b includes the chalcogenide film 210a, 210b respectively formed on each anode film 150a, 150b. The chalcogenide film is selected from the group of copper chalcogenide (e.g., CuS, $Cu_2Se$, $Cu_2S$, $Cu_2Te$, CuTe), bismuth chalcogenide (e.g., $Bi_2Te_3$, $Bi_2Se_3$), and combinations thereof. Each SEI film stack 340a, 340b further includes a $Li_2O$ film 310a, 310b (collectively 310) formed on the chalcogenide film 210a, 210b. Each SEI film stack 340a, 340b further includes a $Li_2CO_3$ film 320a, 320b (collectively 320) formed on the $Li_2O$ film 310a, 310b.

Figure 4:
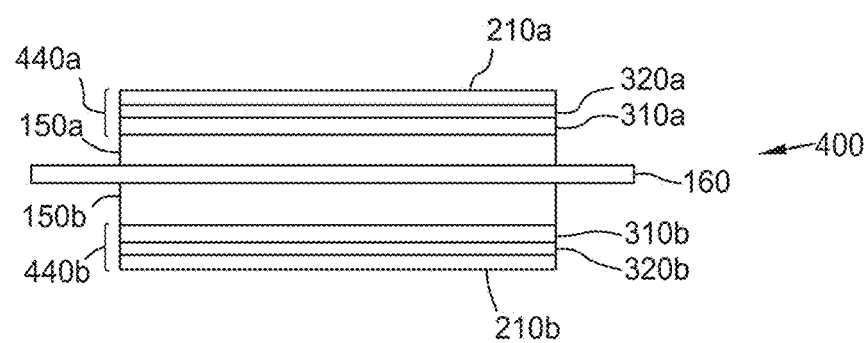
FIG. 4 illustrates a cross-sectional view of another implementation of a dual-sided anode electrode structure having a solid electrolyte interphase (SEI) film stack formed according to implementations described herein.

FIG. 4 illustrates a cross-sectional view of another implementation of a dual-sided anode electrode structure 400 having a solid electrolyte interphase (SEI) film stack 440a, 440b (collectively 440) formed according to implementations described herein. The SEI film stack 440a, 440b may be used in place of the SEI film stack 140 depicted in FIG. 1. Each SEI film stack 440a, 440b includes a $Li_2O$ film 310a, 310b respectively formed on each anode film 150a, 150b. Each SEI film stack 440a, 440b further includes a $Li_2CO_3$ film 320a, 320b formed on the $Li_2O$ film 310a, 310b. Each SEI film stack 440a, 440b further includes the chalcogenide film 210a, 210b formed on the $Li_2CO_3$ film 320a, 320b.

Figure 5:
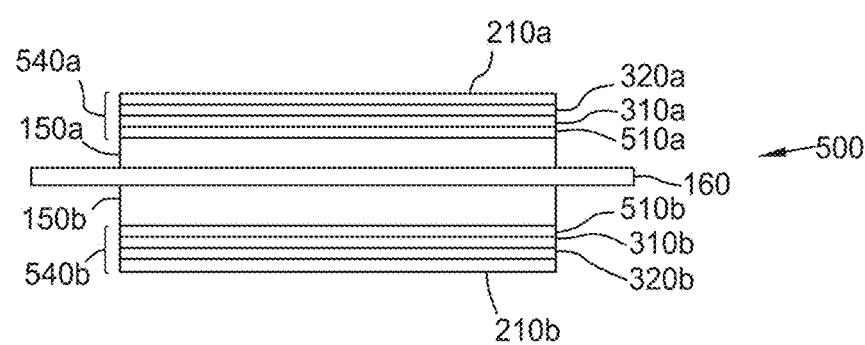
FIG. 5 illustrates a cross-sectional view of another implementation of a dual-sided anode electrode structure having a solid electrolyte interphase (SEI) film stack formed according to implementations described herein.

FIG. 5 illustrates a cross-sectional view of another implementation of a dual-sided anode electrode structure 500 having a solid electrolyte interphase (SEI) film stack 540a, 540b (collectively 540) formed according to implementations described herein. The SEI film stack 540a, 540b may be used in place of the SEI film stack 140 depicted in FIG. 1. Each SEI film stack 540a, 540b includes a lithium nitride ($Li_3N$) film 510a, 510b (collectively 510) respectively formed on each anode film 150a, 150b. Each SEI film stack 540a, 540b further includes a $Li_2O$ film 310a, 310b respectively formed on each lithium nitride film 510a, 510b. Each SEI film stack 540a, 540b further includes a $Li_2CO_3$ film 320a, 320b formed on the $Li_2O$ film 310a, 310b. Each SEI film stack 540a, 540b further includes the chalcogenide film 210a, 210b formed on the $Li_2CO_3$ film 320a, 320b.

Figure 6:
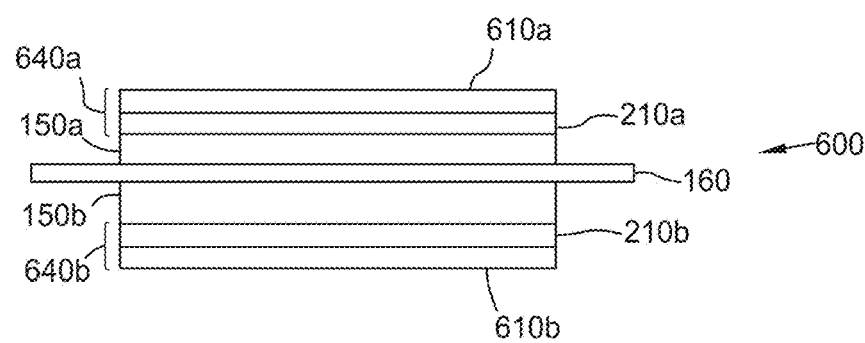
FIG. 6 illustrates a cross-sectional view of another implementation of a dual-sided anode electrode structure having a solid electrolyte interphase (SEI) film stack formed according to implementations described herein.

FIG. 6 illustrates a cross-sectional view of one implementation of a dual-sided anode electrode structure 600 having a solid electrolyte interphase (SEI) film stack 640a, 640b (collectively 640) formed according to implementations described herein. The SEI film stack 640a, 640b may be used in place of the SEI film stack 140 depicted in FIG. 1. Each SEI film stack 640a, 640b includes the chalcogenide film 210a, 210b respectively formed on each anode film 150a, 150b. The chalcogenide film is selected from the group of copper chalcogenide (e.g., CuS, $Cu_2Se$, $Cu_2S$, $Cu_2Te$, CuTe), bismuth chalcogenide (e.g., $Bi_2Te_3$, $Bi_2Se_3$), and combinations thereof. Each SEI film stack 640a, 640b further includes a lithium halide film 610a, 610b (collectively 610) formed on the chalcogenide film 210a, 210b. In one implementation, the lithium halide film is selected form LiF, LiCl, LiBr, and LiI.

Note in FIGS. 2-6 that the anode current collector 160 is shown to extend beyond the stack, although it is not necessary for the anode current collector 160 to extend beyond the stack, the portions extending beyond the stack may be used as tabs. Although the anode electrode structures depicted in FIGS. 2-6 are depicted as dual-sided electrode structures, it should be understood that the implementations described in FIGS. 2-6 also apply to single-sided electrode structures.

Figure 11:
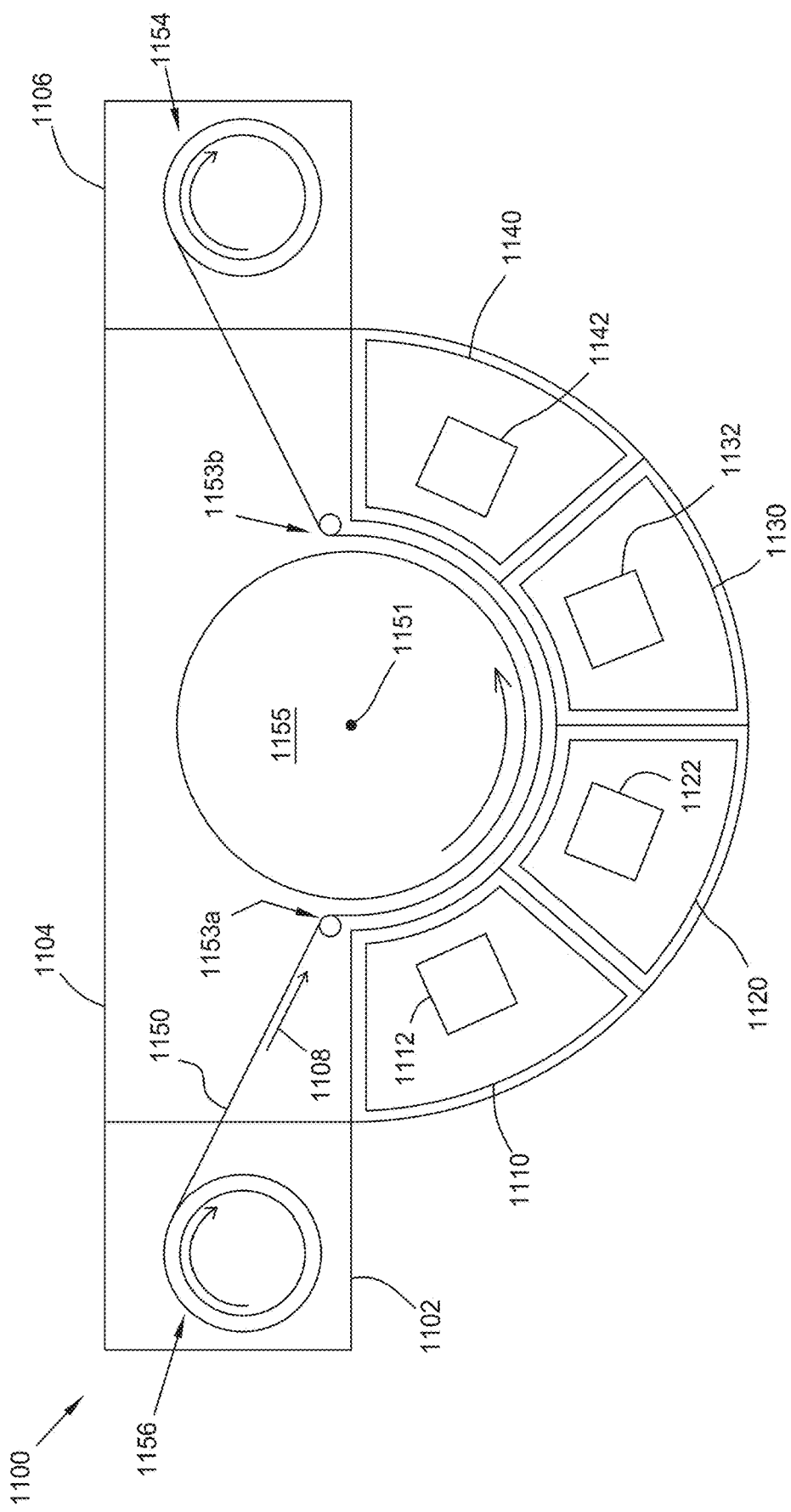
FIG. 11 illustrates a schematic view of an integrated processing tool for forming anode electrode structures according to implementations described herein.

FIG. 7 illustrates a process flow chart summarizing one implementation of a method 700 for forming an anode electrode structure having a solid electrolyte interphase (SEI) film stack according to implementations described herein. In one implementation, the anode electrode structure is the dual-sided anode electrode structure 200 depicted in FIG. 2. In another implementation, the anode electrode structure is the dual-sided anode electrode structure 300 depicted in FIG. 3. At operation 710, a substrate is provided. In one implementation, the substrate is a continuous sheet of material 1150 as shown in FIG. 11. In one implementation, the substrate is the anode current collector 160. Examples of metals that the substrate may be comprised of include aluminum (Al), copper (Cu), zinc (Zn), nickel (Ni), cobalt (Co), manganese (Mn), chromium (Cr), stainless steel, clad materials, alloys thereof, and combinations thereof. In one implementation, the substrate is copper material. In one implementation, the substrate is perforated. Furthermore, the substrate may be of any form factor (e.g., metallic foil, sheet, or plate), shape and micro/macro structure.

In some implementations, the substrate is exposed to a pretreatment process, which includes at least one of a plasma treatment or corona discharge process to remove organic materials from the exposed surfaces of the current collector. The pretreatment process is performed prior to film deposition on the substrate.

At operation 720, a lithium metal film is formed on the substrate. In one implementation, the lithium metal film is the anode film 150 and the substrate is the anode current collector 160. In one implementation, the lithium metal film is formed on a copper current collector. In some implementations, if an anode film is already present on the substrate, the lithium metal film is formed on the anode film. If the anode film 150 is not present, the lithium metal film may be formed directly on the substrate. Any suitable lithium metal film deposition process for depositing thin films of lithium metal may be used to deposit the thin film of lithium metal. Deposition of the thin film of lithium metal may be by PVD processes, such as evaporation, a sputtering process, a slot-die process, a transfer process, or a three-dimensional lithium printing process. The chamber for depositing the thin film of lithium metal may include a PVD system, such as an electron-beam evaporator, a thermal evaporator, or a sputtering system, a thin film transfer system (including large area pattern printing systems such as gravure printing systems) or a slot-die deposition system. In one implementation, the anode film 150 has a thickness of 100 micrometers or less (e.g., from about 1 μm to about 100 μm; from about 3 μm to about 30 μm; from about 20 μm to about 30 μm; from about 1 μm to about 20 μm; or from about 50 μm to about 100 μm).

At operation 730, an SEI film stack is formed on the lithium metal film. The SEI film stack includes a chalcogenide film (e.g., CuS, $Cu_2Se$, $Cu_2S$, $Cu_2Te$, CuTe, $Bi_2Te_3$, or $Bi_2Se_3$ film) and optionally a lithium carbonate ($Li_2CO_3$) film and lithium oxide ($Li_2O$) film. In one implementation, the SEI film stack includes a chalcogenide film (e.g., CuS, $Cu_2Se$, $Cu_2S$, $Cu_2Te$, CuTe, $Bi_2Te_3$, or $Bi_2Se_3$ film) only, similar to the SEI film stack 240 depicted in FIG. 2. In another implementation, the SEI film stack includes a chalcogenide film (e.g., CuS, $Cu_2Se$, $Cu_2S$, $Cu_2Te$, CuTe, $Bi_2Te_3$, or $Bi_2Se_3$ film), a lithium oxide film formed on the chalcogenide film, and a lithium carbonate film formed on the lithium oxide film only, similar to the SEI film stack 340 depicted in FIG. 3.

At operation 740, a chalcogenide film is formed on the lithium metal film. In one implementation, the chalcogenide film is a $Bi_2Te_3$ film. In one implementation, the chalcogenide film is the chalcogenide film 210 depicted in FIGS. 2-6. In one implementation, the chalcogenide film has a thickness of 500 nanometers or less (e.g., from about 1 nm to about 400 nm; from about 25 nm to about 300 nm; from about 50 nm to about 200 nm; from about 100 nm to about 150 nm; from about 10 nm to about 80 nm; or from about 30 to about 60 nanometers). In one implementation, the chalcogenide film is deposited using a PVD process having an RF power source coupled to a target. The target is typically composed of the materials of the chalcogenide film. In one implementation, the target is a bismuth-telluride alloy target. In one implementation, the bismuth-telluride alloy target comprises from about 5 at. % to about 95 at. % bismuth and from about 5 at. % to about 95 at. % tellurium. The plasma may be generated from a non-reactive gas such as argon (Ar), krypton (Kr), nitrogen, etc. For example, a plasma may be generated from argon gas having a flow rate within a range from about 30 standard cubic centimeters (sccm) to about 200 sccm, such as about 100 sccm to about 150 sccm. An RF power may be applied to the target at a power level within a range from about 50 W to about 4,000 W, for example, about 1000 W to about 3000 W, such as about 2000 W. The deposition chamber may be pressurized from about 0.1 mTorr to about 500 mTorr. The deposition chamber may be pressurized from about 0.1 mTorr to about 100 mTorr, for example, from about 10 mTorr to about 30 mTorr, such as 25 mTorr. The substrate may be electrically "floating" and have no bias. The deposition process of operation 740 may be performed at a deposition temperature from about 50° C. to about 400° C., for example, from about 100° C. to about 200° C., such as about 120° C.

In another implementation, the plasma may be generated using a DC power source coupled to bismuth-telluride alloy target. The substrate may be electrically "floating" and have no bias. In this implementation, plasma may be generated from an argon gas having a flow rate within a range from about 30 standard cubic centimeters (sccm) to about 200 sccm, such as about 100 sccm to about 150 sccm. A DC power may be applied to the target at a power level within a range from about 50 W to about 5,000 W, from about 1000 W to about 3000 W, for example between about 1000 W to about 2000 W, such as about 2000 W. The deposition chamber may be pressurized from about 0.1 mTorr to about 500 mTorr. The deposition chamber may be pressurized from about 0.1 mTorr to about 100 mTorr, for example, from about 10 mTorr to about 30 mTorr, such as 25 mTorr. The substrate may be electrically "floating" and have no bias. The deposition process of operation 740 may be performed at a deposition temperature from about 50° C. to about 400° C., for example, from about 100° C. to about 200° C., such as about 120° C.

Optionally, at operation 750, a lithium oxide ($Li_2O$) film is formed on the chalcogenide film. In one implementation, the lithium oxide film is the lithium oxide film 310 depicted in FIGS. 2-6. In one implementation, the lithium oxide film has a thickness of 500 nanometers or less (e.g., from about 1 nm to about 4000 nm; from about 25 nm to about 300 nm; from about 50 nm to about 200 nm; or from about 100 nm to about 150 nm). In one implementation, the lithium oxide film is formed by depositing an additional lithium metal film on the chalcogenide film and exposing the lithium metal film to a plasma oxidation process to oxidize the lithium metal film. In one implementation, the lithium oxide film is formed by depositing an additional lithium metal film via PVD in an oxygen-containing atmosphere. In one implementation, portions of the lithium metal film deposited during operation 720 remain exposed after deposition of the chalcogenide film during operation 740. The exposed portions of lithium metal film are then exposed to a plasma oxidation process to form the lithium oxide film.

Optionally, at operation 760, a lithium carbonate ($Li_2CO_3$) film is formed on the lithium oxide film. In one implementation, the lithium carbonate film is the lithium carbonate film 320 depicted in FIGS. 3-5. In one implementation, the lithium carbonate film has a thickness of 500 nanometers or less (e.g., from about 1 nm to about 400 nm; from about 25 nm to about 300 nm; from about 50 nm to about 200 nm; or from about 100 nm to about 150 nm). In one implementation, the lithium carbonate film is formed by depositing an additional lithium metal film on the lithium oxide film and exposing the lithium metal film to a plasma oxidation process (e.g., gas treatment using at least one of $O_2$ and $CO_2$) to oxidize the lithium metal film. In one implementation, the lithium oxide film is formed by depositing an additional lithium metal film via PVD in an oxygen-containing atmosphere (e.g., atmosphere containing at least one of $O_2$ and $CO_2$). In one implementation, portions of the lithium oxide film deposited during operation 750 are exposed to a plasma oxidation process to form the lithium carbonate film.

FIG. 8 illustrates a process flow chart summarizing one implementation of another method 800 for forming an anode electrode structure having a solid electrolyte interphase (SEI) film stack according to implementations described herein. In one implementation, the anode electrode structure is the dual-sided anode electrode structure 400 depicted in FIG. 4. In another implementation, the anode electrode structure is the dual-sided anode electrode structure 500 depicted in FIG. 5. At operation 810, a substrate is provided. In one implementation, the substrate is the continuous sheet of material 1150 as shown in FIG. 11. In one implementation, the substrate is the anode current collector 160. Examples of metals that the substrate may be comprised of include aluminum (Al), copper (Cu), zinc (Zn), nickel (Ni), cobalt (Co), manganese (Mn), chromium (Cr), stainless steel, clad materials, alloys thereof, and combinations thereof. In one implementation, the substrate is copper material. In one implementation, the substrate is perforated. Furthermore, the substrate may be of any form factor (e.g., metallic foil, sheet, or plate), shape and micro/macro structure.

In some implementations, the substrate is exposed to a pretreatment process, which includes at least one of a plasma treatment or corona discharge process to remove organic materials from the exposed surfaces of the current collector. The pretreatment process is performed prior to film deposition on the substrate.

At operation 820, a lithium metal film is formed on the substrate. In one implementation, the lithium metal film is the anode film 150 and the substrate is the anode current collector 160. In one implementation, the lithium metal film is formed on a copper current collector. In some implementations, if an anode film is already present on the substrate, the lithium metal film is formed on the anode film. If the anode film 150 is not present, the lithium metal film may be formed directly on the substrate. Any suitable lithium metal film deposition process for depositing thin films of lithium metal may be used to deposit the thin film of lithium metal. Deposition of the thin film of lithium metal may be by PVD processes, such as evaporation, a sputtering process, a slot-die process, a transfer process, or a three-dimensional lithium printing process. The chamber for depositing the thin film of lithium metal may include a PVD system, such as an electron-beam evaporator, a thermal evaporator, or a sputtering system, a thin film transfer system (including large area pattern printing systems such as gravure printing systems) or a slot-die deposition system. In one implementation, the anode film 150 has a thickness of 100 micrometers or less (e.g., from about 1 μm to about 100 μm; from about 3 μm to about 30 μm; from about 20 μm to about 30 μm; from about 1 μm to about 20 μm; or from about 50 μm to about 100 μm).

At operation 830, an SEI film stack is formed on the lithium metal film. The SEI film stack includes a lithium oxide ($Li_2O$) film, a lithium carbonate ($Li_2CO_3$) film, a chalcogenide film (e.g., CuS, $Cu_2Se$, $Cu_2S$, $Cu_2Te$, CuTe, $Bi_2Te_3$, or $Bi_2Se_3$ film) and optionally a lithium nitride ($Li_3N$) film (See FIG. 5). In one implementation, the SEI film stack includes a lithium nitride ($Li_3N$) film formed on the lithium metal film, a lithium oxide ($Li_2O$) film formed on the lithium nitride film, a lithium carbonate ($Li_2CO_3$) film formed on the lithium oxide film, and a chalcogenide film (e.g., $Bi_2Te_3$ film) formed on the lithium carbonate film, similar to the SEI film stack 540 depicted in FIG. 5. In another implementation, the SEI film stack includes a lithium oxide ($Li_2O$) film formed on the lithium metal film, a lithium carbonate ($Li_2CO_3$) film formed on the lithium oxide film, and a chalcogenide film (e.g., CuS, $Cu_2Se$, $Cu_2S$, $Cu_2Te$, CuTe, $Bi_2Te_3$, or $Bi_2Se_3$ film) formed on the lithium carbonate film, similar to the SEI film stack 440 depicted in FIG. 4.

Optionally, at operation 840, a lithium nitride ($Li_3N$) film is formed on the lithium metal film. In one implementation, the lithium nitride film is the lithium nitride film 510 depicted in FIG. 5. In one implementation, the lithium nitride film has a thickness of 500 nanometers or less (e.g., from about 1 nm to about 400 nm; from about 25 nm to about 300 nm; from about 50 nm to about 200 nm; or from about 1 nm to about 50 nm). In one implementation, the lithium nitride film is formed by depositing an additional lithium metal film on the lithium metal film and exposing the lithium metal film to a plasma nitridation process to form the lithium nitride film. In one implementation, the lithium nitride film is formed by depositing an additional lithium metal film via PVD in a nitrogen-containing atmosphere.

At operation 850, a lithium oxide ($Li_2O$) film is formed. If the lithium nitride film is present, the lithium oxide film is formed on the lithium nitride film. If the lithium nitride is not present, the lithium oxide film is formed on the lithium metal film. In one implementation, the lithium oxide film is the lithium oxide film 310 depicted in FIGS. 4-5. In one implementation, the lithium oxide film has a thickness of 500 nanometers or less (e.g., from about 1 nm to about 4000 nm; from about 25 nm to about 300 nm; from about 50 nm to about 200 nm; or from about 100 nm to about 150 nm). In one implementation, the lithium oxide film is formed by depositing an additional lithium metal film on the lithium nitride film and exposing the lithium metal film to a plasma oxidation process to oxidize the lithium metal film. In one implementation, the lithium oxide film is formed by depositing an additional lithium metal film via PVD in an oxygen-containing atmosphere. In one implementation, the lithium nitride film is exposed to a plasma oxidation process to form the lithium oxide film. In one implementation where the lithium nitride film is not present, the lithium metal film deposited during operation 820 is exposed to a plasma oxidation process to form the lithium oxide film.

At operation 860, a lithium carbonate ($Li_2CO_3$) film is formed on the lithium oxide film. In one implementation, the lithium carbonate film is the lithium carbonate film 320 depicted in FIGS. 4-5. In one implementation, the lithium carbonate film has a thickness of 500 nanometers or less (e.g., from about 1 nm to about 400 nm; from about 25 nm to about 300 nm; from about 50 nm to about 200 nm; or from about 100 nm to about 150 nm). In one implementation, the lithium carbonate film is formed by depositing an additional lithium metal film on the lithium oxide film and exposing the lithium metal film to a plasma oxidation process (e.g., gas treatment using at least one of $O_2$ and $CO_2$) to oxidize the lithium metal film. In one implementation, the lithium oxide film is formed by depositing an additional lithium metal film via PVD in an oxygen-containing atmosphere (e.g., atmosphere containing at least one of $O_2$ and $CO_2$). In one implementation, portions of the lithium oxide film deposited during operation 750 are exposed to a plasma oxidation process to form the lithium carbonate film.

At operation 870, a chalcogenide film is formed on the lithium carbonate film. In one implementation, the chalcogenide film is a $Bi_2Te_3$ film. In one implementation, the chalcogenide film is the chalcogenide film 210 depicted in FIGS. 4-5. In one implementation, the chalcogenide film is deposited using the process conditions described in operation 740. In one implementation, the chalcogenide film has a thickness of 500 nanometers or less (e.g., from about 1 nm to about 400 nm; from about 25 nm to about 300 nm; from about 50 nm to about 200 nm; from about 100 nm to about 150 nm; from about 10 nm to about 80 nm; or from about 30 to about 60 nanometers). The chalcogenide film may be formed using any suitable deposition process. In one implementation, the chalcogenide film is deposited using the processes described for operation 740.

FIG. 9 illustrates a process flow chart summarizing one implementation of another method 900 for forming an anode electrode structure having a solid electrolyte interphase (SEI) film stack according to implementations described herein. In one implementation, the anode electrode structure is the dual-sided anode electrode structure 600 depicted in FIG. 6. At operation 910, a substrate is provided. In one implementation, the substrate is the continuous sheet of material 1150 as shown in FIG. 11. In one implementation, the substrate is the anode current collector 160. Examples of metals that the substrate may be comprised of include aluminum (Al), copper (Cu), zinc (Zn), nickel (Ni), cobalt (Co), manganese (Mn), chromium (Cr), stainless steel, clad materials, alloys thereof, and combinations thereof. In one implementation, the substrate is copper material. In one implementation, the substrate is perforated. Furthermore, the substrate may be of any form factor (e.g., metallic foil, sheet, or plate), shape and micro/macro structure.

In some implementations, the substrate is exposed to a pretreatment process, which includes at least one of a plasma treatment or corona discharge process to remove organic materials from the exposed surfaces of the current collector. The pretreatment process is performed prior to film deposition on the substrate.

At operation 920, a lithium metal film is formed on the substrate. In one implementation, the lithium metal film is the anode film 150 and the substrate is the anode current collector 160. In one implementation, the lithium metal film is formed on a copper current collector. In some implementations, if an anode film is already present on the substrate, the lithium metal film is formed on the anode film. If the anode film 150 is not present, the lithium metal film may be formed directly on the substrate. Any suitable lithium metal film deposition process for depositing thin films of lithium metal may be used to deposit the thin film of lithium metal. Deposition of the thin film of lithium metal may be by PVD processes, such as evaporation, a sputtering process, a slot-die process, a transfer process, or a three-dimensional lithium printing process. The chamber for depositing the thin film of lithium metal may include a PVD system, such as an electron-beam evaporator, a thermal evaporator, or a sputtering system, a thin film transfer system (including large area pattern printing systems such as gravure printing systems) or a slot-die deposition system. In one implementation, the anode film 150 has a thickness of 100 micrometers or less (e.g., from about 1 µm to about 100 µm; from about 3 µm to about 30 µm; from about 20 µm to about 30 µm; from about 1 µm to about 20 µm; or from about 50 µm to about 100 µm).

At operation 930, an SEI film stack is formed on the lithium metal film. The SEI film stack includes a chalcogenide film (e.g., CuS, $Cu_2Se$, $Cu_2S$, $Cu_2Te$, CuTe, $Bi_2Te_3$, or $Bi_2Se_3$ film) and a lithium fluoride (LiF) film formed on the chalcogenide film similar to the SEI film stack 640 depicted in FIG. 6.

At operation 940, a chalcogenide film is formed on the lithium carbonate film. In one implementation, the chalcogenide film is a $Bi_2Te_3$ film. In one implementation, the chalcogenide film is the chalcogenide film 210 depicted in FIGS. 4-5. In one implementation, the chalcogenide film is deposited using the process conditions described in operation 740. In one implementation, the chalcogenide film has a thickness of 500 nanometers or less (e.g., from about 1 nm to about 400 nm; from about 25 nm to about 300 nm; from about 50 nm to about 200 nm; from about 100 nm to about 150 nm; from about 10 nm to about 80 nm; or from about 30 to about 60 nanometers). The chalcogenide film may be formed using any suitable deposition process. In one implementation, the chalcogenide film is deposited using the processes described for operation 740.

At operation 950, a lithium halide film is formed on the chalcogenide film. In one implementation, the lithium halide film is the lithium halide film 610 depicted in FIG. 6. In one implementation, the lithium halide film is deposited on the chalcogenide film by Physical Vapor Deposition (PVD), such as evaporation or sputtering, special atomic layer deposition (ALD), a slot-die process, a thin-film transfer process, or a three-dimensional lithium printing process. In one implementation, PVD is the method for deposition of the lithium fluoride film. In one implementation, the lithium halide film is selected form LiF, LiCl, LiBr, and LiI. In one implementation, the lithium halide film is a lithium fluoride film. In one implementation, the lithium halide film is deposited using a thermal evaporation process. In one implementation, the lithium fluoride film has a thickness of 500 nanometers or less (e.g., from about 1 nm to about 400 nm; from about 25 nm to about 300 nm; from about 50 nm to about 200 nm; or from about 100 nm to about 150 nm).

FIG. 10 illustrates a process flow chart summarizing one implementation of another method 1000 for forming an anode electrode structure having a solid electrolyte interphase (SEI) film stack according to implementations described herein. In one implementation, the anode electrode structure is the dual-sided anode electrode structure 600 depicted in FIG. 6. At operation 1010, a substrate is provided. In one implementation, the substrate is the continuous sheet of material 1150 as shown in FIG. 11. In one implementation, the substrate is the anode current collector 160. Examples of metals that the substrate may be comprised of include aluminum (Al), copper (Cu), zinc (Zn), nickel (Ni), cobalt (Co), manganese (Mn), chromium (Cr), stainless steel, clad materials, alloys thereof, and combinations thereof. In one implementation, the substrate is copper material. In one implementation, the substrate is perforated. Furthermore, the substrate may be of any form factor (e.g., metallic foil, sheet, or plate), shape and micro/macro structure.

In some implementations, the substrate is exposed to a pretreatment process, which includes at least one of a plasma treatment or corona discharge process to remove organic materials from the exposed surfaces of the current collector. The pretreatment process is performed prior to film deposition on the substrate.

At operation 1020, a lithium metal film is formed on the substrate. In one implementation, the lithium metal film is the anode film 150 and the substrate is the anode current collector 160. In one implementation, the lithium metal film is formed on a copper current collector. In some implementations, if an anode film is already present on the substrate, the lithium metal film is formed on the anode film. If the anode film 150 is not present, the lithium metal film may be formed directly on the substrate. Any suitable lithium metal film deposition process for depositing thin films of lithium metal may be used to deposit the thin film of lithium metal. Deposition of the thin film of lithium metal may be by PVD processes, such as evaporation, a sputtering process, a slot-die process, a transfer process, or a three-dimensional lithium printing process. The chamber for depositing the thin film of lithium metal may include a PVD system, such as an electron-beam evaporator, a thermal evaporator, or a sputtering system, a thin film transfer system (including large area pattern printing systems such as gravure printing systems) or a slot-die deposition system. In one implementation, the anode film 150 has a thickness of 100 micrometers or less (e.g., from about 1 µm to about 100 µm; from about 3 µm to about 30 µm; from about 20 µm to about 30 µm; from about 1 µm to about 20 µm; or from about 50 µm to about 100 µm).

At operation 1030, an SEI film stack is formed on the lithium metal film. The SEI film stack includes a lithium halide and chalcogenide composite film. In one implementation, the SEI film stack further comprises at least one of a lithium fluoride (LiF) film, a lithium carbonate ($Li_2CO_3$) film, a lithium oxide film, a lithium nitride ($Li_3N$) film, a chalcogenide film and combinations thereof. The composite film may be a composite film comprising chalcogenide materials (e.g., CuS, $Cu_2Se$, $Cu_2S$, $Cu_2Te$, CuTe, $Bi_2Te_3$, or $Bi_2Se_3$ film) and lithium halide materials (e.g., lithium fluoride).

At operation 1040, the lithium halide and the chalcogenide composite film is formed on the underlying film (e.g., lithium metal film). In one implementation, the lithium halide and the chalcogenide composite film is a LiF and $Bi_2Te_3$ composite film. In one implementation, the lithium halide and chalcogenide composite film is the chalcogenide film 210 depicted in FIGS. 4-5. In one implementation, the lithium halide and chalcogenide composite film is deposited using the process conditions described in operation 740, operation 940, or a combination of the processes of operation 740 and 940. In one implementation, the lithium halide and chalcogenide composite film has a thickness of 500 nanometers or less (e.g., from about 1 nm to about 400 nm; from about 25 nm to about 300 nm; from about 50 nm to about 200 nm; from about 100 nm to about 150 nm; from about 10 nm to about 80 nm; or from about 30 to about 60 nanometers). The lithium halide and chalcogenide composite film may be formed using any suitable deposition process. In one implementation, the lithium halide and chalcogenide composite film is deposited by Physical Vapor Deposition (PVD), such as evaporation or sputtering, special atomic layer deposition (ALD), a slot-die process, a thin-film transfer process, three-dimensional lithium printing process, or combinations thereof. In one implementation, PVD is the method for deposition of the lithium fluoride film.

FIG. 11 illustrates a schematic view of a flexible substrate coating apparatus 1100 for forming anode electrode structures according to implementations described herein. The flexible substrate coating apparatus 1100 may be a SMART-WEB®, manufactured by Applied Materials, adapted for manufacturing lithium anode devices according to the implementations described herein. According to typical implementations, the flexible substrate coating apparatus 1100 can be used for manufacturing lithium anodes, and particularly for SEI film stacks for lithium anodes. The flexible substrate coating apparatus 1100 is constituted as a roll-to-roll system including an unwinding module 1102, a processing module 1104 and a winding module 1106. In certain implementations, the processing module 1104 comprises a plurality of processing modules or chambers 1110, 1120, 1130 and 1140 arranged in sequence, each configured to perform one processing operation to the continuous sheet of material 1150 or web of material. In one implementation, as depicted in FIG. 11, the processing chambers 1110-1140 are radially disposed about a coating drum 1155. Arrangements other than radial are contemplated. For example, in another implementation, the processing chambers may be positioned in a linear configuration.

In one implementation, the processing chambers 1110-1140 are stand-alone modular processing chambers wherein each modular processing chamber is structurally separated from the other modular processing chambers. Therefore, each of the stand-alone modular processing chambers, can be arranged, rearranged, replaced, or maintained independently without affecting each other. Although four processing chambers 1110-1140 are shown, it should be understood that any number of processing chambers may be included in the flexible substrate coating apparatus 1100.

The processing chambers 1110-1140 may include any suitable structure, configuration, arrangement, and/or components that enable the flexible substrate coating apparatus 1100 to deposit a lithium anode device according to implementations of the present disclosure. For example, but not limited to, the processing chambers may include suitable deposition systems including coating sources, power sources, individual pressure controls, deposition control systems, and temperature control. According to typical implementations, the chambers are provided with individual gas supplies. The chambers are typically separated from each other for providing a good gas separation. The flexible substrate coating apparatus 1100 according to implementations described herein is not limited in the number of deposition chambers. For example, but not limited to, flexible substrate coating apparatus 1100 may include 3, 6, or 12 processing chambers.

The processing chambers 1110-1140 typically include one or more deposition units 1112, 1122, 1132, and 1142. Generally, the one or more deposition units as described herein can be selected from the group of a CVD source, a PECVD source, and a PVD source. The one or more deposition units can include an evaporation source, a sputter source, such as, a magnetron sputter source, a DC sputter source, an AC sputter source, a pulsed sputter source, a radio frequency (RF) sputtering source, or a middle frequency (MF) sputtering source. For instance, MF sputtering with frequencies in the range of 5 kHz to 100 kHz, for example, 30 kHz to 50 kHz, can be provided. The one or more deposition units can include an evaporation source. In one implementation, the evaporation source is a thermal evaporation source or an electron beam evaporation source. In one implementation, the evaporation source is a lithium (Li) source. Further, the evaporation source may also be an alloy of two or more metals. The material to be deposited (e.g., lithium) can be provided in a crucible. The lithium can, for example, be evaporated by thermal evaporation techniques or by electron beam evaporation techniques.

In some implementations, any of the processing chambers 1110-1140 of the flexible substrate coating apparatus 1100 may be configured for performing deposition by sputtering, such as magnetron sputtering. As used herein, "magnetron sputtering" refers to sputtering performed using a magnet assembly, that is, a unit capable of a generating a magnetic field. Typically, such a magnet assembly includes a permanent magnet. This permanent magnet is typically arranged within a rotatable target or coupled to a planar target in a manner such that the free electrons are trapped within the generated magnetic field generated below the rotatable target surface. Such a magnet assembly may also be arranged coupled to a planar cathode.

Magnetron sputtering may also be realized by a double magnetron cathode, such as, but not limited to, a Twin-Mag™ cathode assembly. In some implementations, the cathodes in the processing chamber may be interchangeable. Thus, a modular design of the apparatus is provided which facilitates optimizing the apparatus for particular manufacturing processes. In some implementations, the number of cathodes in a chamber for sputtering deposition is chosen for optimizing an optimal productivity of the flexible substrate coating apparatus 1100.

In some implementations, one or some of the processing chambers 1110-1140 may be configured for performing sputtering without a magnetron assembly. In some implementations, one or some of the chambers may be configured for performing deposition by other methods, such as, but not limited to, chemical vapor deposition, atomic laser deposition or pulsed laser deposition. In some implementations, one or some of the chambers may be configured for performing a plasma treatment process, such as a plasma oxidation or plasma nitridation process.

In certain implementations, the processing chambers 1110-1140 are configured to process both sides of the continuous sheet of material 1150. Although the flexible substrate coating apparatus 1100 is configured to process the continuous sheet of material 1150, which is horizontally oriented, the flexible substrate coating apparatus 1100 may be configured to process substrates positioned in different orientations, for example, the continuous sheet of material 1150 may be vertically oriented. In certain implementations, the continuous sheet of material 1150 is a flexible conductive substrate. In certain implementations, the continuous sheet of material 1150 includes a conductive substrate with one or more layers formed thereon. In certain implementations, the conductive substrate is a copper substrate.

In certain implementations, the flexible substrate coating apparatus 1100 comprises a transfer mechanism 1152. The transfer mechanism 1152 may comprise any transfer mechanism capable of moving the continuous sheet of material 1150 through the processing region of the processing chambers 1110-1140. The transfer mechanism 1152 may comprise a common transport architecture. The common transport architecture may comprise a reel-to-reel system with a common take-up-reel 1154 positioned in the winding module 1106, the coating drum 1155 positioned in the processing module 1104, and a feed reel 1156 positioned in the unwinding module 1102. The take-up reel 1154, the coating drum 1155, and the feed reel 1156 may be individually heated. The take-up reel 1154, the coating drum 1155 and the feed reel 1156 may be individually heated using an internal heat source positioned within each reel or an external heat source. The common transport architecture may further comprise one or more auxiliary transfer reels 1153*a*, 1153*b* positioned between the take-up reel 1154, the coating drum 1155, and the feed reel 1156. Although the flexible substrate coating apparatus 1100 is depicted as having a single processing region, in certain implementations, it may be advantageous to have separated or discrete processing regions for each individual processing chamber 1110-1140. For implementations having discrete processing regions, modules, or chambers, the common transport architecture may be a reel-to-reel system where each chamber or processing region has an individual take-up-reel and feed reel and one or more optional intermediate transfer reels positioned between the take-up reel and the feed reel.

The flexible substrate coating apparatus 1100 may comprise the feed reel 1156 and the take-up reel 1154 for moving the continuous sheet of material 1150 through the different processing chambers 1110-1140. In one implementation, the first processing chamber 1110 and the second processing chamber 1120 are each configured to deposit a portion of a lithium metal film. The third processing chamber 1130 is configured to deposit a chalcogenide film. The fourth processing chamber 1140 is configured to deposit a lithium oxide or lithium fluoride film over the chalcogenide film. In another implementation where the continuous sheet of material 1150 is a polymer material, the first processing chamber 1110 is configured to deposit a copper film on the polymer material. The second processing chamber 1120 and the third processing chamber 1130 are each configured to deposit a portion of a lithium metal film. The fourth processing chamber 1140 is configured to deposit a chalcogenide film. In some implementations, the finished negative electrode will not be collected on the take-up reel 1154 as shown in the figures, but may go directly for integration with the separator and positive electrodes, etc., to form battery cells.

In one implementation, processing chambers 1110-1120 are configured for depositing a thin film of lithium metal on the continuous sheet of material 1150. Any suitable lithium deposition process for depositing thin films of lithium metal may be used to deposit the thin film of lithium metal. Deposition of the thin film of lithium metal may be by PVD processes, such as evaporation, a slot-die process, a transfer process, a lamination process or a three-dimensional lithium printing process. The chambers for depositing the thin film of lithium metal may include a PVD system, such as an electron-beam evaporator, a thin film transfer system (including large area pattern printing systems such as gravure printing systems), a lamination system, or a slot-die deposition system.

In one implementation, the third processing chamber 1130 is configured for depositing a chalcogenide film on the lithium metal film. The chalcogenide film may be deposited using a PVD sputtering technique as described herein. In one implementation, the fourth processing chamber 1140 is configured for forming a lithium oxide film or a lithium fluoride film on the chalcogenide film. Any suitable lithium deposition process for depositing thin films of lithium metal may be used to deposit the thin film of lithium metal. Deposition of the thin film of lithium metal may be by PVD processes, such as evaporation, a slot-die process, a transfer process, a lamination process or a three-dimensional lithium printing process. In one implementation, the fourth processing chamber 1140 is an evaporation chamber or PVD chamber configured to deposit a lithium fluoride film or lithium oxide film over the continuous sheet of material 1150. In one implementation, the evaporation chamber has a processing region that is shown to comprise an evaporation source that may be placed in a crucible, which may be a thermal evaporator or an electron beam evaporator (cold) in a vacuum environment, for example.

In operation, the continuous sheet of material 1150 is unwound from the feed reel 1156 as indicated by the substrate movement direction shown by arrow 1108. The continuous sheet of material 1150 may be guided via one or more auxiliary transfer reels 1153*a*, 1153*b*. It is also possible that the continuous sheet of material 1150 is guided by one or more substrate guide control units (not shown) that shall control the proper run of the flexible substrate, for instance, by fine adjusting the orientation of the flexible substrate.

After uncoiling from the feed reel 1156 and running over the auxiliary transfer reel 1153*a*, the continuous sheet of material 1150 is then moved through the deposition areas provided at the coating drum 1155 and corresponding to positions of the deposition units 1112, 1122, 1132, and 1142. During operation, the coating drum 1155 rotates around axis 1151 such that the flexible substrate moves in the direction of arrow 1108.

EXAMPLES

The following non-limiting examples are provided to further illustrate implementations described herein. However, the examples are not intended to be all inclusive and are not intended to limit the scope of the implementations described herein.

Lithium samples were cut into 1.0 cm² discs and polished with a stainless steel brush inside an Argon glove box. This was followed by pressing the lithium with polypropylene to get a fine metallic luster foil. Lithium foils having a thickness of about 160 µm were placed on a stainless steel spacer and transferred to a PVD deposition chamber using a transfer vessel. The target in the PVD deposition chamber was n-type with the composition of 38.6% Bi, 55.1% Te. The PVD deposition chamber was filled with argon and a continuous argon flow of about 150 sccm was established. The deposition time was approximately 90 seconds. A process pressure of approximately 25 mTorr was established within the PVD deposition chamber. A deposition temperature of approximately 120 degrees Celsius was established in the PVD deposition chamber. A deposition power of 2 kW (for 86.5 Å/second) was used. A spacing of about 57 millimeters was established between the target and the lithium sample. After completion of the $Bi_2Te_3$ deposition process, the samples were transferred to an argon glove box for further studies. The thickness of the $Bi_2Te_3$ films deposited varied from about 50 to 200 nanometers. Coin cells including the lithium and $Bi_2Te_3$ films were assembled and subjected to testing.

Figure 12B:
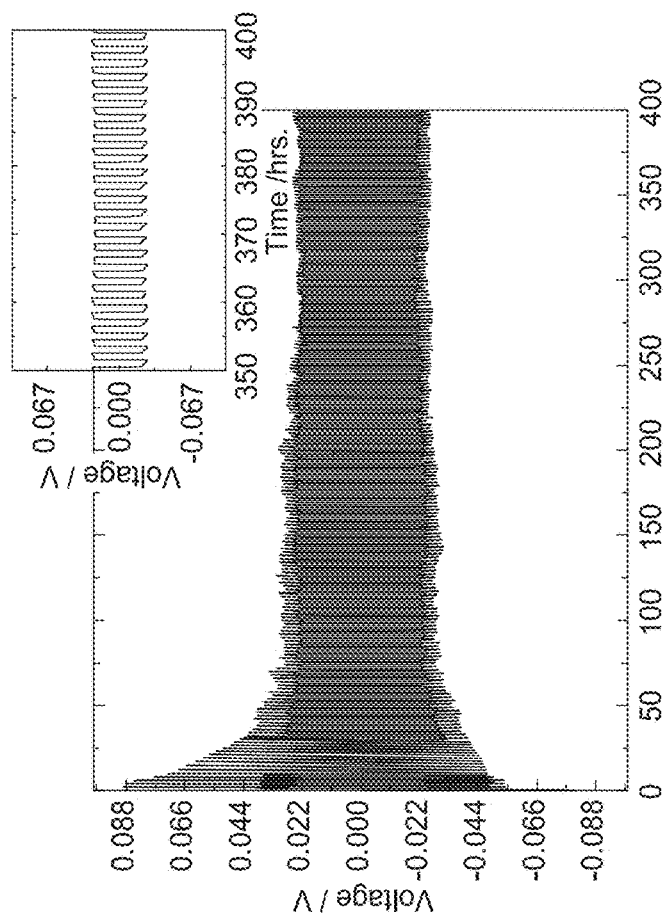
FIGS. 12A-12D are plots depicting cell voltage changes versus time for a symmetric lithium cell (1 hour cycle) at a current density of 0.25 mA/cm$^2$.
Figure 12A:
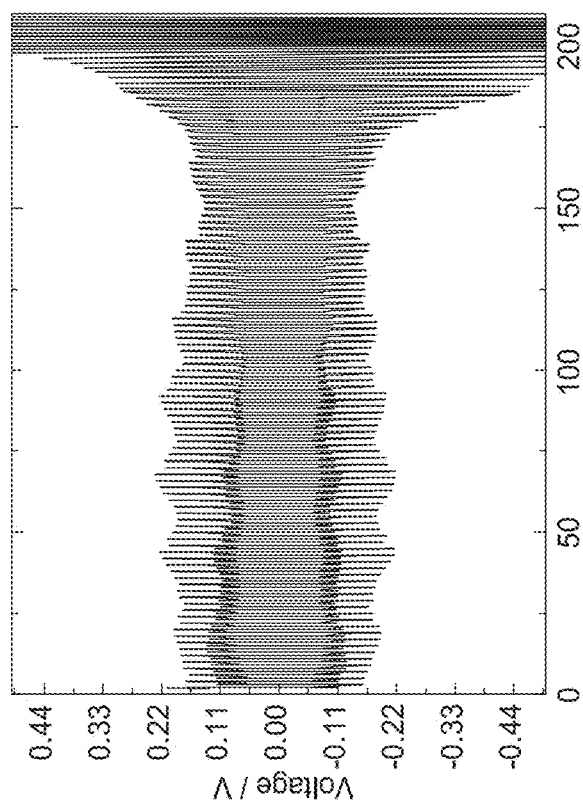
Figures 12C, 12D:
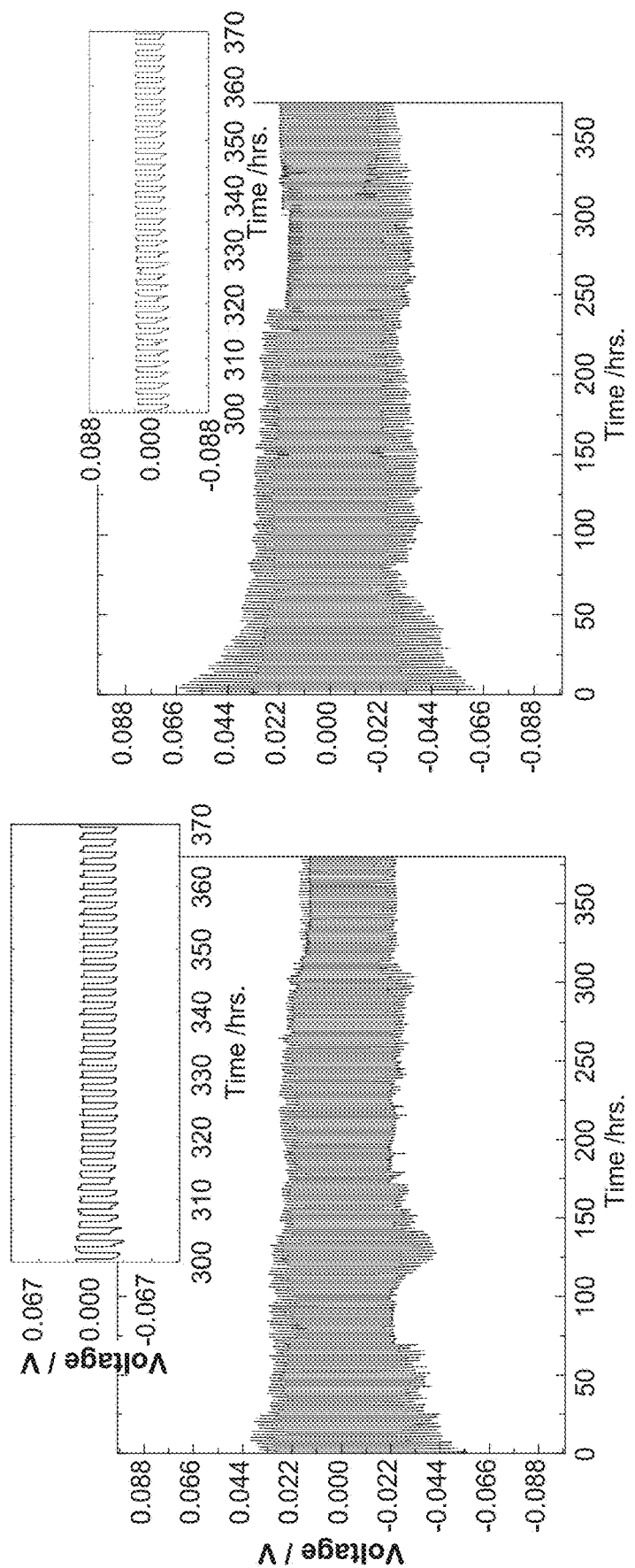

FIGS. 12A-12D are plots depicting cell voltage changes versus time for a symmetric lithium cell (1 hour cycle) at a current density of 0.25 mA/cm². The Li/Li symmetric cell studies are excellent to investigate the reversibility of Li anode. FIG. 11A illustrates the cell arrangements of a control cell. The control cell is a Li∥Li symmetrical cell with bare lithium foil as the electrode while FIGS. 12B-D illustrate a $Bi_2Te_3$ protected cell employing the lithium foil covered with few nanometers of $Bi_2Te_3$ on its top as the electrode (Li|$Bi_2Te_3$∥$Bi_2Te_3$|Li). A standard electrolyte which contained 1M $LiPF_6$ in EC/DEC solvent (volume ratio=1:1) was used. The symmetric cells with the standard electrolyte were assembled as a 2032-type coin cell and were cycled at current densities of 0.250 mA/cm² and 3 mA/cm². As cycling proceeds, lithium plating and stripping continuously change the surface of lithium. It is noted from FIG. 12A and FIG. 12B that the fresh protected cell exhibited higher impedance due to the insulating nature of $Bi_2Te_3$, however after the formation cycle the impedance was reduced and outperformed control cells in performance.

Figure 13A:
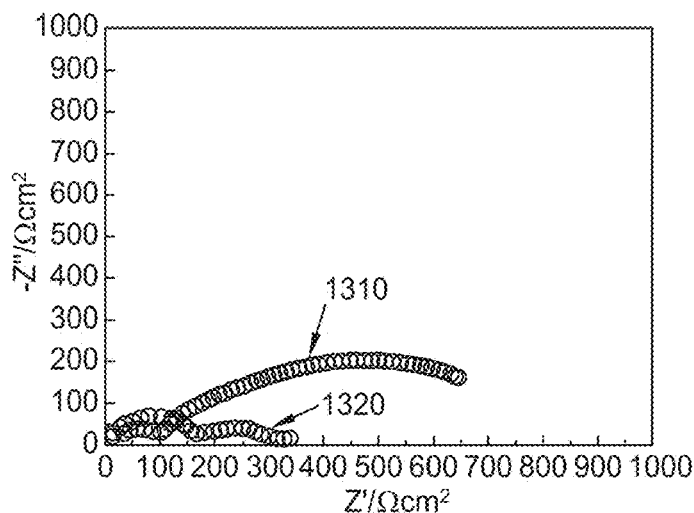
FIGS. 13A-13B are plots of impedance spectra for Li/Li symmetric cells using a chalcogenide modified interface according to implementations described herein.
Figure 13B:
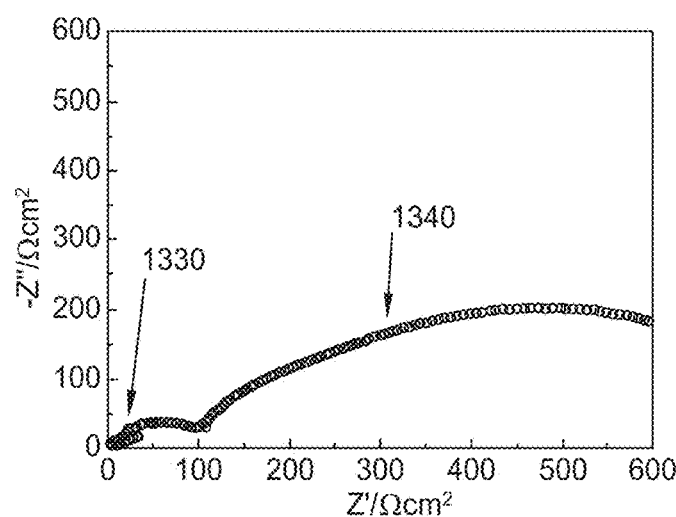

FIGS. 13A-13B are plots of impedance spectra for Li/Li symmetric cells using $Bi_2Te_3$ modified interface and unmodified lithium control. Impedance spectra for the Li/Li symmetric cells using $Bi_2Te_3$ modified interface as shown by trace 1310 and control unmodified lithium as shown by trace 1320. The interface resistance as shown by trace 1330 reduced dramatically after 300 hours of cycling with the $Bi_2Te_3$ modified interface as shown by trace 1340.

Figure 14:
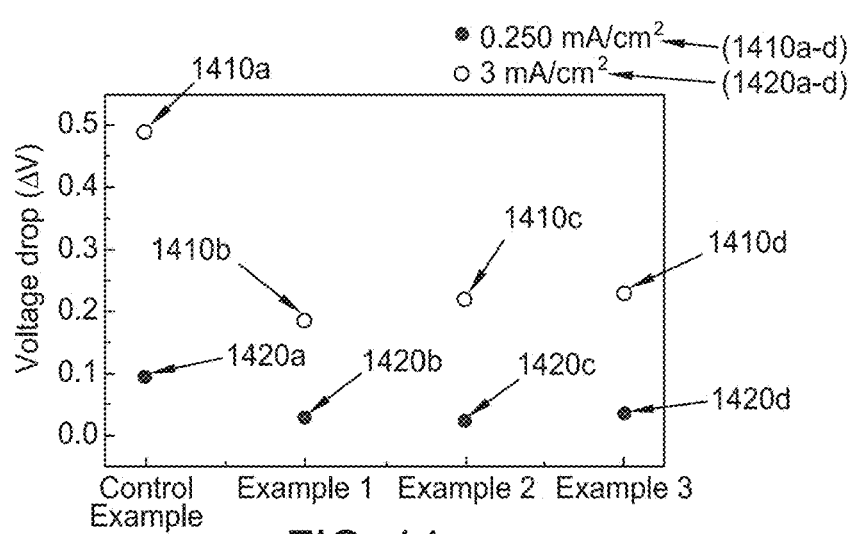
FIG. 14 is a plot depicting a comparison of lithium control samples vs. a chalcogenide modified interface according to implementations described herein.

FIG. 14 is a plot depicting a comparison of voltage drop for a control samples versus a $Bi_2Te_3$ modified interface as shown in examples 1 to 3 after 100 hours polarization at current densities of 0.250 mA/cm², as shown by points 1410a-d and 3 mA/cm², as shown by points 1420a-d. In comparison, the $Bi_2Te_3$ protected cell shows a stable cycling ability for 400 hours and a low polarization (≈150 mV) at the same current density (FIGS. 12B and 12C). Thus, the superior cyclability of the protected cell implies a homogeneous lithium deposit and less consumption of both lithium and electrolyte occurring in the cell. The stable cyclability demonstrates the effectiveness of $Bi_2Te_3$ in improving and limiting lithium dendrite formation and enhancing the reversibility.

Figure 15A:
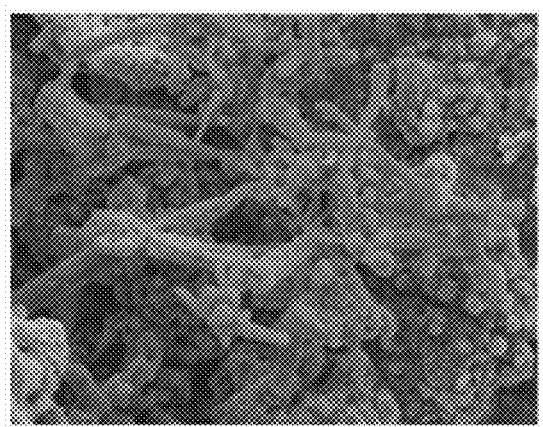
FIGS. 15A-15B are SEM images of lithium for a control cell and a cell having a chalcogenide modified interface according to implementations described herein.
Figure 15B:
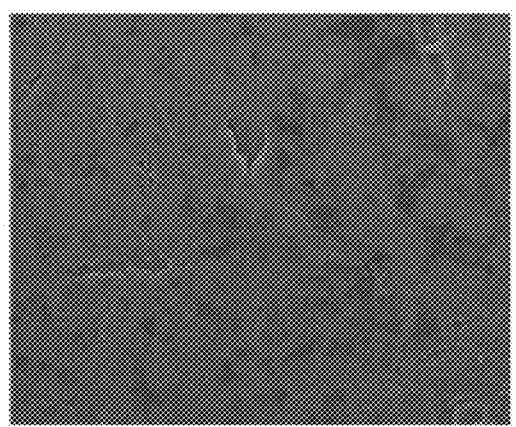

FIG. 15A is a SEM image of lithium control cell. FIG. 15B is a SEM image of a $Bi_2Te_3$ protected cell. The morphologies of the lithium metal electrode surface from galvanostatic cycling measurements were analyzed by scanning electron microscopy. FIGS. 15A and 15B illustrate the lithium surface after cycling for 50 charge/discharge cycles in 1M $LiPF_6$ (EC: DEC 2% FEC). The lithium electrode contact with the control lithium metal forms needle-like nanostructures, as shown in FIG. 15A, while the lithium surface in contact with the $Bi_2Te_3$ film, as shown in FIG. 15B, forms a dense uniform electrodeposit. These results demonstrate that the voltage instabilities observed in FIG. 12A and the improved stability directly results from the interface modifications of $Bi_2Te_3$.

Figure 16A:
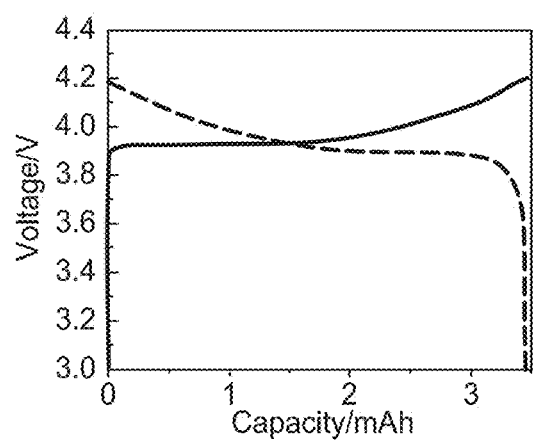
FIGS. 16A-16B are plots depicting discharge capacity versus cycle number for a bare lithium metal anode and a lithium metal anode protected with a chalcogenide modified interface according to implementations described herein.
Figure 16B:
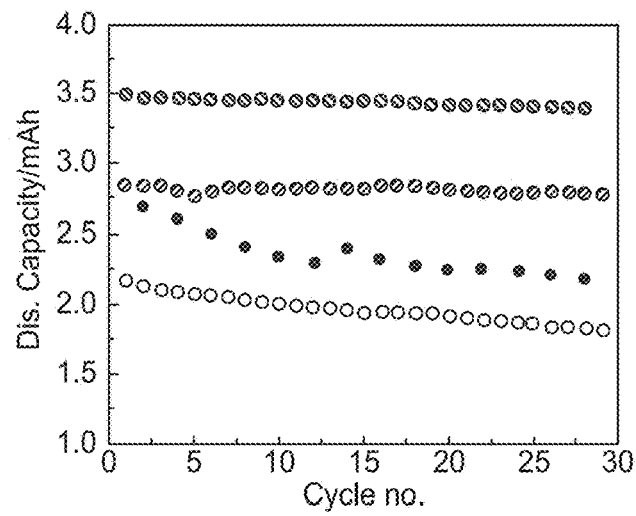

FIGS. 16A-16B are plots depicting discharge capacity versus cycle number for a bare lithium metal anode and a lithium metal anode protected with $Bi_2Te_3$. Li/$LiCoO_2$ CR2032 coin cells with $Bi_2Te_3$ modified Li as proof-of-concept platform to test the efficacy of the anode passivation procedure described herein. Full cells were made with Li metal as anode and commercial Lithium Cobalt oxide as the cathode with 1M $LiPF_6$ (EC: DEC 2% FEC) electrolytes. It was observed from FIG. 16A that cells containing 50-100 nm $Bi_2Te_3$ on a lithium surface provide improved capacity retention for at least 30 charge-discharge cycles at a high current density of 3 mA/cm². Protection of the lithium metal with $Bi_2Te_3$ not only prevents this self-discharge during the rest period before we begin electrochemical cycling but also prevents the capacity loss during the first 10 cycles, with the capacity of cells using $Bi_2Te_3$-protected anodes falling a negligible amount from ~3.5 mAh/cm² as shown in FIG. 16B. After 30 cycles, cells with bare Li metal anodes lost their initial capacity more predominantly, while cells with protected Li metal anodes had a marginal loss.

Figure 18:
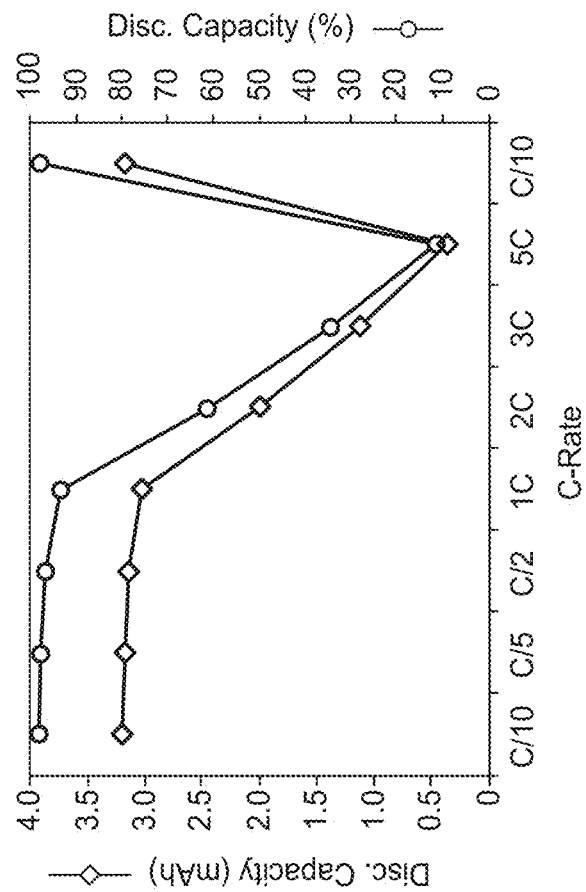
FIG. 18 is a plot depicting the corresponding discharge capacity variations vs. C rate for a lithium metal anode protected with a chalcogenide modified interface according to implementations described herein.
Figure 17:
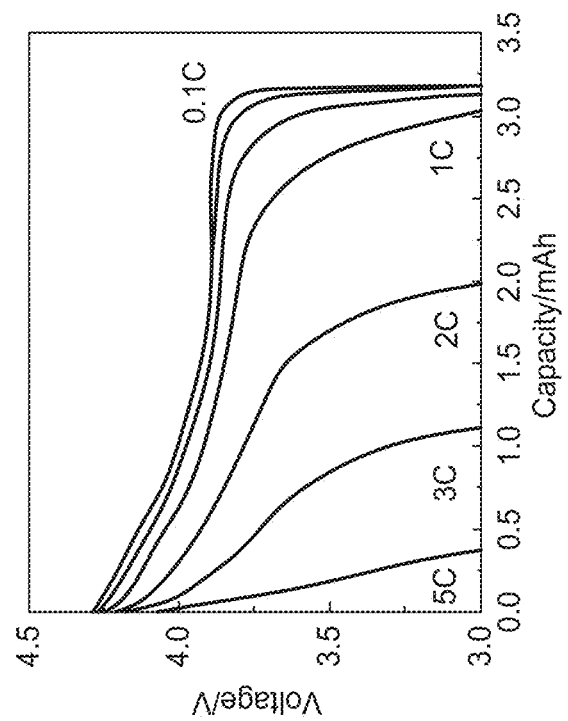
FIG. 17 is a plot depicting cell voltage versus capacity at different discharge rates (0.1 C to 5 C) for a lithium metal anode protected with a chalcogenide modified interface according to implementations described herein.
Figure 19:
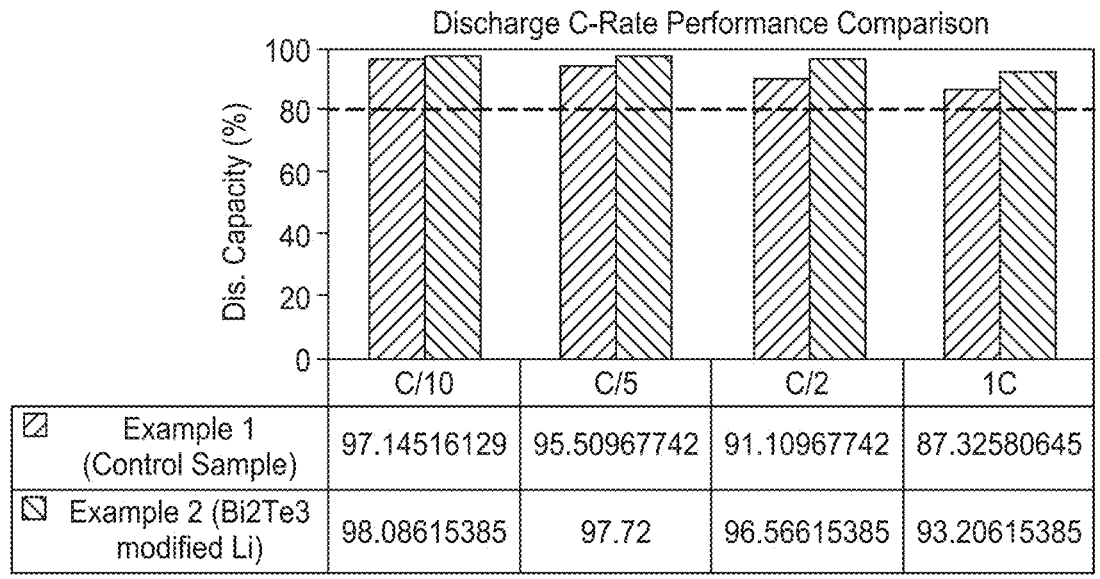
FIG. 19 is a plot comparing the percentage of discharge capacity retention at different discharge rates.
Figure 20:
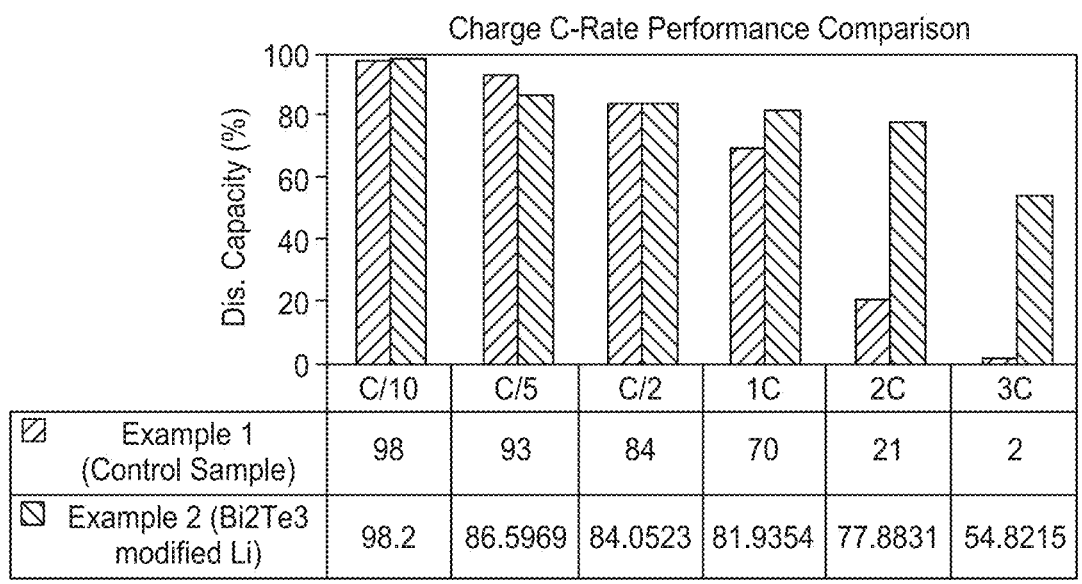
FIG. 20 is a plot comparing charge rate capacity variations versus C rate for a control sample versus a lithium metal anode protected with a chalcogenide modified interface according to implementations described herein.

To evaluate the rate capabilities of the control example and $Bi_2Te_3$ coated samples, electrodes were subjected to charge-discharge cycling with different currents and the discharge capacity values are shown in FIG. 17 and FIG. 18. FIG. 19 is a plot comparing the percentage of discharge capacity retention at different discharge rates. FIG. 20 is a plot comparing charge rate capacity variations versus C rate. It is seen that the discharge capacity retention of the material remains very stable and gives 95% capacity retention at 1 C discharge rates for the comparative example. To further illustrate, a comparison of charge capacity retention is plotted. In this example, lithium is deposited on top of the modified interface. It is shown that $Bi_2Te_3$ coating of the electrodes has positive impact on retention, 80% capacity retention at C/10, C/5, C/2, 1C, and 2C rates when compared with the control example. This further illustrates the advantage of $Bi_2Te_3$ coating on Li metal.

In summary, the some implementations of the present disclosure provide methods for constructing a stable and efficient SEI film including chalcogenide materials and devices incorporating the SEI film. The SEI film is formed in the energy storage device during fabrication (e.g., ex-situ) of the energy storage device. It has been found by the inventors that inclusion of chalcogenide materials in the SEI film helps inhibit lithium dendrite growth. Not to be bound by theory but it is believed that inhibition of the lithium dendrite growth helps achieve superior lithium metal cycling performance relative to current lithium based anodes, which rely on an in-situ SEI film formed mostly during first charge of the energy storage device.

When introducing elements of the present disclosure or exemplary aspects or implementation(s) thereof, the articles "a," "an," "the" and "said" are intended to mean that there are one or more of the elements.

The terms "comprising," "including" and "having" are intended to be inclusive and mean that there may be additional elements other than the listed elements.

While the foregoing is directed to implementations of the present disclosure, other and further implementations of the disclosure may be devised without departing from the basic scope thereof, and the scope thereof is determined by the claims that follow.

The invention claimed is:

1. A method, comprising:
   forming a lithium metal film over a current collector, the current collector comprising a copper film; and
   forming a solid electrolyte interface (SEI) film stack on the lithium metal film, comprising:
   forming a chalcogenide film on the lithium metal film, wherein the chalcogenide film is selected from a group of a bismuth chalcogenide film, a copper chalcogenide film, or a combination thereof; and
   forming a lithium halide film on the chalcogenide film.

2. The method of claim 1, wherein the lithium halide film is selected from lithium fluoride, lithium chloride, lithium bromide, and lithium iodide.

3. The method of claim 2, wherein the chalcogenide film is the bismuth chalcogenide film.

4. The method of claim 2, wherein the chalcogenide film is the copper chalcogenide film.

5. The method of claim 1, wherein the lithium halide film is selected from lithium chloride and lithium bromide.

6. The method of claim 1, further comprising an anode film formed between the current collector and the lithium metal film.

7. The method of claim 1, wherein the lithium metal film contacts the copper film.

8. The method of claim 1, wherein the chalcogenide film is selected from a group of $CuS$, $Cu_2Se$, $Cu_2S$, $Cu_2Te$, $CuTe$, $Bi_2Te_3$, $Bi_2Se_3$, or a combination thereof.

9. A method, comprising:
   forming a lithium metal film over a current collector, the current collector comprising a copper film; and
   forming a solid electrolyte interface (SEI) film stack on the lithium metal film, comprising:
   forming a composite film on the lithium metal film, wherein the composite film comprises a lithium halide material and a chalcogenide material, wherein the chalcogenide material is selected from a group of a bismuth chalcogenide, a copper chalcogenide, or a combination thereof.

10. The method of claim 9, wherein the lithium halide material is selected from lithium fluoride, lithium chloride, lithium bromide, and lithium iodide.

11. The method of claim 10, wherein the chalcogenide material is selected from a group of $CuS$, $Cu_2Se$, $Cu_2S$, $Cu_2Te$, $CuTe$, $Bi_2Te_3$, $Bi_2Se_3$, or a combination thereof.

12. The method of claim 10, wherein the chalcogenide material is the bismuth chalcogenide.

13. The method of claim 10, wherein the chalcogenide material is the copper chalcogenide.

14. The method of claim 9, further comprising an anode film formed between the current collector and the lithium metal film.

15. The method of claim 9, wherein the lithium metal film contacts the copper film.

16. An electrode structure, comprising:
    a current collector comprising a copper film;
    a lithium metal film formed over the current collector; and
    a solid electrolyte interface (SEI) film stack formed on the lithium metal film, comprising:
    a chalcogenide film on the lithium metal film, wherein the chalcogenide film is selected from a group of a bismuth chalcogenide film, a copper chalcogenide film, or a combination thereof; and
    a lithium halide film on the chalcogenide film.

17. The electrode structure of claim 16, wherein the lithium halide film is selected from lithium fluoride, lithium chloride, lithium bromide, and lithium iodide.

18. The electrode structure of claim 16, wherein the lithium halide film is selected from lithium chloride and lithium bromide.

19. The electrode structure of claim 16, wherein the chalcogenide film is the bismuth chalcogenide film.

20. The electrode structure of claim 16, further comprising an anode film formed between the current collector and the lithium metal film.

* * * * *